United States Patent
Mecklem et al.

(10) Patent No.: US 11,417,227 B2
(45) Date of Patent: Aug. 16, 2022

(54) AIRCRAFT DETECT AND AVOID GAUGE

(71) Applicant: THE BOEING COMPANY, Chicago, IL (US)

(72) Inventors: Sarah Anne Mecklem, Brisbane (AU); Brendan Patrick Williams, Brisbane (AU); Darcy Lynn Davidson, Dallesport, WA (US); John W. Benton, Hoodriver, OR (US); Lennon Richard Cork, Hoodriver, OR (US); Peter Barton Popenoe, White Salmon, WA (US)

(73) Assignee: THE BOEING COMPANY, Chicago, IL (US)

( * ) Notice: Subject to any disclaimer, the term of this patent is extended or adjusted under 35 U.S.C. 154(b) by 289 days.

(21) Appl. No.: 16/792,403

(22) Filed: Feb. 17, 2020

(65) Prior Publication Data
US 2020/0202732 A1    Jun. 25, 2020

Related U.S. Application Data

(63) Continuation-in-part of application No. 15/994,454, filed on May 31, 2018, now Pat. No. 10,867,519.

(51) Int. Cl.
| | | |
|---|---|---|
| *G08G 5/04* | (2006.01) | |
| *B64D 43/00* | (2006.01) | |
| *B64C 39/02* | (2006.01) | |

(52) U.S. Cl.
CPC .............. *G08G 5/045* (2013.01); *B64D 43/00* (2013.01); *B64C 39/024* (2013.01); *B64C 2201/146* (2013.01)

(58) Field of Classification Search
CPC ...... G08G 5/045; B64D 43/00; B64C 39/024; B64C 2201/146
(Continued)

(56) References Cited

U.S. PATENT DOCUMENTS

| | | |
|---|---|---|
| 5,732,697 A | 3/1998 | Zhang et al. |
| 7,706,979 B1 | 4/2010 | Herwitz |

(Continued)

FOREIGN PATENT DOCUMENTS

| | | |
|---|---|---|
| EP | 2196974 A1 | 6/2010 |
| EP | 3089115 A1 | 11/2016 |
| GB | 2492665 A | 1/2013 |

OTHER PUBLICATIONS

Fulton, Neale L. et al., "Aircraft Proximiy: a synthesis of Appollonius, X-track, and Well Clear Vollume pardigms," 2018 IEEE/AIAA 37th Digital Avionics Systems Conference (DASC), London, 2018, pp. 1-10, doi: 10.1109/DASC.2018.8569870.

(Continued)

*Primary Examiner* — Yazan A Soofi
(74) *Attorney, Agent, or Firm* — Moore IP Law

(57) ABSTRACT

A method of generating an aircraft display includes receiving data at a device. The data includes information associated with a first aircraft and one or more other aircraft in an airspace associated with the first aircraft. The method includes determining, at the device, estimated flightpaths for the first aircraft and the one or more other aircraft. The method includes generating, at the device, a detect and avoid gauge display based on a current flightpath of the first aircraft and the estimated flightpaths. The method also includes sending, from the device to a display device coupled to the device, the detect and avoid gauge for display. The detect and avoid gauge is configured to display a flightpath indicator to indicate a direction of travel of the first aircraft and is configured to display alert bands related to projected separation violations with respect to the one or more other aircraft.

21 Claims, 9 Drawing Sheets

(58) Field of Classification Search
USPC .......................................................... 701/120
See application file for complete search history.

(56) References Cited

U.S. PATENT DOCUMENTS

| | | | |
|---|---|---|---|
| 10,139,474 B2* | 11/2018 | Gurusamy | G08G 5/0008 |
| 11,230,366 B2* | 1/2022 | Shavit | B64C 13/18 |
| 2002/0133294 A1 | 9/2002 | Farmakis et al. | |
| 2007/0222665 A1 | 9/2007 | Koeneman | |
| 2009/0259402 A1 | 10/2009 | Gates et al. | |
| 2012/0150367 A1 | 6/2012 | Potagnik et al. | |
| 2012/0303252 A1* | 11/2012 | Schwinn | G08G 5/045 |
| | | | 701/120 |
| 2013/0179009 A1 | 7/2013 | Gershzohn | |
| 2014/0257602 A1 | 9/2014 | Gaston | |
| 2015/0154874 A1 | 6/2015 | Murthy et al. | |
| 2015/0364044 A1 | 12/2015 | Kashi et al. | |
| 2016/0071422 A1 | 3/2016 | Bazawada et al. | |
| 2018/0090018 A1 | 3/2018 | Gavrilets et al. | |
| 2019/0304314 A1 | 10/2019 | Hochwarth et al. | |
| 2019/0371183 A1* | 12/2019 | Mecklem | G08G 5/0021 |
| 2020/0111375 A1* | 4/2020 | Garden | G08G 5/0017 |
| 2020/0202732 A1 | 6/2020 | Mecklem et al. | |

OTHER PUBLICATIONS

Fulton, Neale L. et al., "The Apollonian paradigm in Cockpit and Ground-based Pilot Display Design," 2019 IEEE/AIAA 38th Digital Avionics Systems Conference (DASC), San Diego, CA, USA, 2019, pp. 1-10, doi: 10.1109/DASC43569.2019.9081694.

Extended European Search Report for Application No. 19183220.3 dated Mar. 5, 2020, 6 pgs.

Edwards, Gerald D., et al., "Visual Aspects of Air Collision Avoidance: Computer Studies on Pilot Warning Indicator Specifications—Final Report," NASA-Ames Research Center, Grant No. NG-05-009-059, pp. 1-29.

Extended European Search Report for Application No. 19191085.0, dated Dec. 19, 2019, 7 pgs.

Fulton, N.L., and Huynh, U. 2015. Conflict Management: Apollonius in Airspace Design, Safety Science, vol. 72, pp. 9-22, Feb. 2015.

Garden, Grace et al. "A Novel Approach to the Generation of Aircraft Collision Avoidance Advisories," 2019 IEEE/AIAA 38th Digital Avionics Systems Conference Sep. 2019, DOI: 10.1109/DASC43569.2019.9081694, pp. 1-12.

INEXA Control, Par of INEXA solutions, https://www.insitu.com/inexa-control, retrieved Sep. 2, 2020, 4 pgs.

Munoz, C. et al. "DAIDALUS: Detect and Avoid Alerting Logic for Unmanned Systems," In Proc. 34th Digital Avionics Systems Conference, Prague, Czech Republic, Sep. 13-17, 2015, pp. 1-18.

Munoz, Cesar A., et al., "A Family of Well-Clear Boundary Models for the Integration of UAS with the NAS,"AIAA Aviation Forum, Jun. 16-20, 2014, Atlanta Georgia, 14th AIAA Aviation Technology, Integration, and Operations Conference, American Institute of Aeronautics and Astronautics, DOI: 10.2514/6.2014-2412, pp. 1-16.

Randle, Jr., Robert J., "Visual Field Narrowing by Non Visual Factors," Flying Safety, Jul. 1982, pp. 14-18.

RTCA, Inc., Minimum Operational Performance Standards (MOPS) for Detect and Avoid (DAA) Systems, RTCA Paper No. 261-15/_MC-1400, Version 3.9, Dec. 9, 2016, pp. 1-775.

U.S. Department of Transportation, Federal Aviation Administration, "Introduction to TCAS II, Version 7.1," Feb. 28, 2011, pp. 1-50.

Wadley, Jason E. et al., "Development of an Automatic Aircraft Collision Avoidance System for Fighter Aircraft," Guidance, Navigation, and Control and Co-located Conferences, Aug. 19-22, 2013, Boston MA, American Institute of Aeronautics and Astronautics, pp. 1-12.

Darrah, Sara, "Air Force's C-ABSAA Program, Automation Lessons Learned," U.S. Air Force, Sep. 20, 2017, 37 pgs.

RTCA, Inc., Minimum Operational Performance Standards (MOPS) for Detect and Avoid (DAA) Systems, RTCA Paper No. 261-15/PMC-1400, Dec. 9, 2016, 775 pgs.

Shively, J., "NASA UAS Integration Into the NAS Project Detect, and Avoid Display Evaluations," Air Force—NASA Bi-Annual Research Council Meeting, Oct. 12, 2016, 10 pgs.

* cited by examiner

AIRCRAFT DETECT AND AVOID GAUGE

CROSS-REFERENCE TO RELATED APPLICATIONS

This application claims priority from, and is a continuation-in-part of, U.S. patent application Ser. No. 15/994,454, filed May 31, 2018, the entire contents of which are expressly incorporated herein.

FIELD OF THE DISCLOSURE

The present disclosure is generally related to an aircraft flight information system, and more particularly to a detect and avoid gauge of the aircraft flight information system.

BACKGROUND

For automatically piloted aircraft, Detect and Avoid (DAA) systems use information descriptive of an airspace to make automated maneuvering decisions. For manned aircraft, DAA systems can greatly improve pilot situational awareness by providing a pilot with relevant data about the airspace. DAA systems can be used in conventional manned aircraft and for unmanned, remotely piloted aircraft, since in both situations the pilot can have limited access to the relevant airspace information.

To improve DAA system operation and design, the Radio Technical Commission for Aeronautics (RTCA) has published a document entitled "SC228 Ph 1 Minimum Operational Performance Standard (MOPS)," which suggests minimum features of a DAA system, including some features of displays (or other human machine interfaces) used by DAA systems. Generally, the SC228 Ph 1 MOPS document addresses issues related to unmanned aircraft operating at high altitudes, rather than low-altitude airspace operations for manned or unmanned aircraft. Additionally, the SC228 Ph 1 MOPS document does not describe how to gather and analyze airspace data to generate a display including pilot-relevant information and does not provide guidance on arranging such displays to reduce pilot workload. The SC228 Ph 1 MOPS document also does not describe the use of DAA systems in a cockpit to support conventionally-piloted aircraft operations.

SUMMARY

In a particular implementation, an aircraft flight information system includes a processor. A display device and a memory are coupled to the processor. The memory device stores instructions executable by the processor. The instructions are executable by the processor to receive data associated with a first aircraft and one or more other aircraft in an airspace associated with the first aircraft. The instructions are executable by the processor to send a user interface based on the data to the display device for display. The user interface includes a system monitor panel including gauges. The gauges include a detect and avoid gauge configured to display a flightpath indicator for the first aircraft and projected separation violations with respect to the one or more other aircraft.

In a particular implementation, a method of generating an aircraft display includes receiving data at a device. The data includes information associated with a first aircraft and one or more other aircraft in an airspace associated with the first aircraft. The method includes determining, at the device, estimated flightpaths for the first aircraft and the one or more other aircraft. The method includes generating, at the device, a detect and avoid gauge display based on a current flightpath of the first aircraft and the estimated flightpaths. The method also includes sending, from the device to a display device coupled to the device, the detect and avoid gauge for display. The detect and avoid gauge is configured to display a flightpath indicator to indicate a direction of travel of the first aircraft and is configured to display alert bands related to projected separation violations with respect to the one or more other aircraft.

In a particular implementation, a detect and avoid gauge for an aircraft flight information system includes a flightpath indicator. The flightpath indicator includes an arrow indicating a direction of travel of a first aircraft. The detect and avoid gauge also includes a region configured to display second information related to projected separation violations of the first aircraft relative to one or more other aircraft in an airspace associated with the first aircraft, the projected separation violations determined based on a plurality of possible directions of travel of the first aircraft.

DETAILED DESCRIPTION

Figure 1:
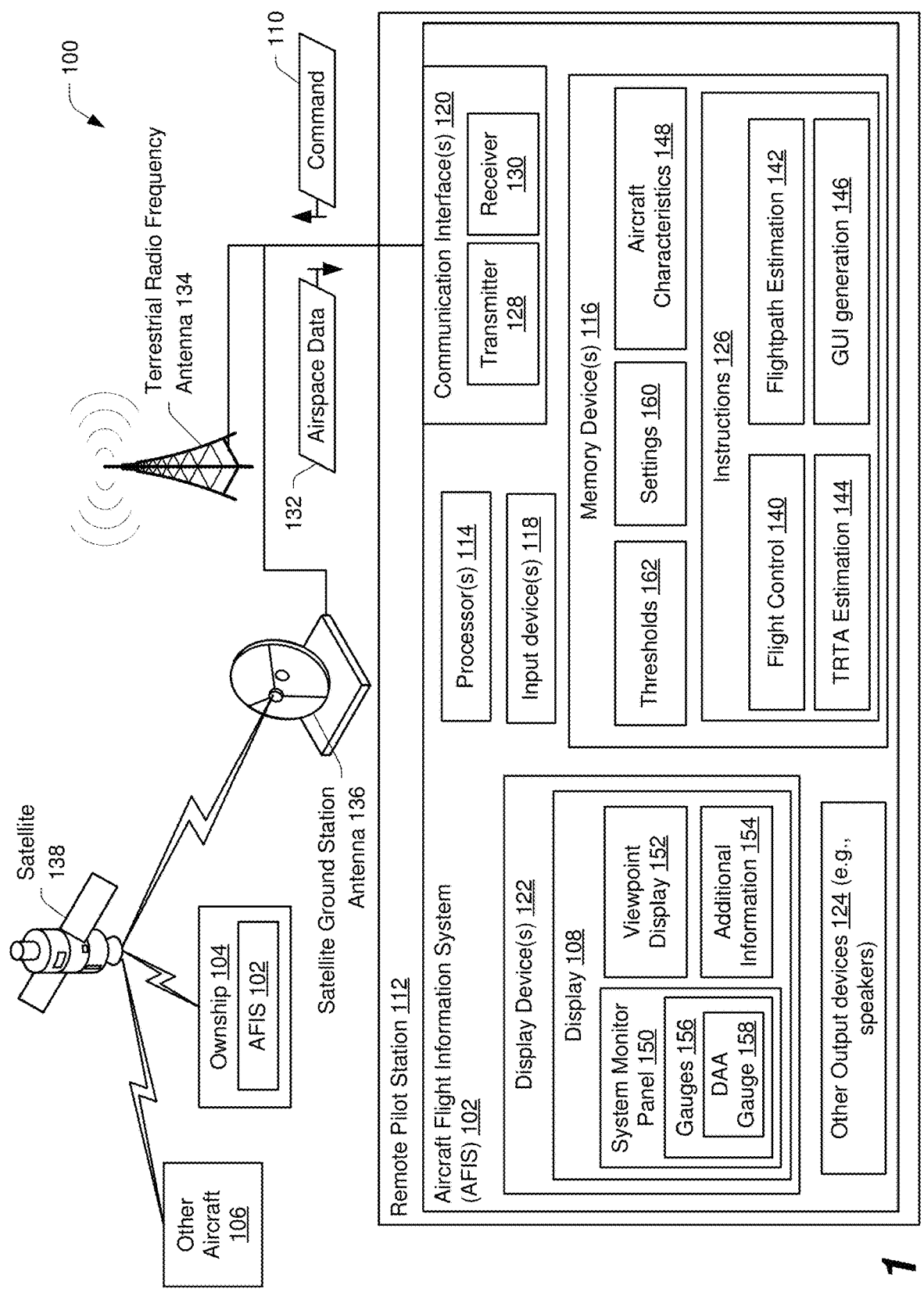
FIG. 1 is a block diagram that illustrates an example of a system that includes an aircraft flight information system.

Implementations disclosed herein provide human machine interfaces that improve pilot situational awareness and reduce pilot workload by organizing data presented to the pilot in a manner that prioritizes the data and simplifies understanding of the data. Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 2, multiple aircraft are illustrated and associated with reference numbers 106A, 106B, 106C, and 106D. When referring to a particular one of these aircraft, such as the aircraft 106A, the distinguishing letter "A" is used. However, when referring to any arbitrary one of these aircraft or to these aircraft as a group, the reference number 106 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. Additionally, "adjusting" and "modifying" can be used interchangeably. For example, "adjusting" or "modifying" a parameter can refer to changing the parameter from a first value to a second value (a "modified value" or an "adjusted value"). As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Implementations disclosed herein include elements of a DAA system, or more generally of an aircraft flight information system. In particular, the aircraft flight information system is configured to generate a display including warning information and guidance information to pilots. The flight information system includes a DAA gauge. In an implementation, the DAA gauge includes a first region with an arrow indicating a direction of travel of an aircraft controlled by the flight information system. The DAA gauge includes a second region to display information related to projected separation violations of the aircraft relative to one or more other aircraft in an airspace associated with the aircraft. The DAA gauge also includes a time remaining to act (TRTA) countdown timer that indicates a time remaining to act before a separation violation condition occurs.

The disclosure also includes methods of determining and generating the information to be displayed, including generating the DAA gauge. The display provides a pilot using the flight information system (which may be a remote pilot) with information indicating the location, identification, and other relevant information (e.g., estimated or projected flightpaths) related to aircraft in an airspace. The display also identifies (and prioritizes) potential hazards in the airspace using visual cues, which may be supplemented with audible cues. The display also provides the pilot with information about the aircraft being piloted, such as flightpaths, altitudes/vertical profiles, and locations of waypoints. The display is constructed to reduce pilot workload by displaying a consistent set of information that is readily understandable to the pilot. For example, in some implementations, the aircraft flight information system avoids generating the display in a manner that switches between providing advice on where to avoid directing the aircraft (e.g., "no-go" advice) and where to direct the aircraft ("go" advice). Switching between go advice and no-go advice can lead to pilot confusion and increase pilot workload since the pilot has to evaluate each piece of information presented in the display in a timely manner to decide whether the information is go advice or no-go advice.

In some implementations, the aircraft flight information system generates warnings associated with potential violations of a first separation condition (e.g., a well clear volume) for the aircraft in a first color (e.g., yellow), warnings associated with violations of a second separation condition (e.g., a mid-air collision volume) in a second color (e.g., red) distinct from the first color when the aircraft is in violation of the first separation condition, and warnings that the aircraft and a second aircraft are in violation of the second separation condition by having icons associated with the aircraft and the second aircraft flash on and off in red. In other implementations, in addition or alternatively, other suitable Human Machine Interface (HMI) devices (e.g., colors, highlighting, sizing, underlining, italics, bold text, lighting effects, etc.) are utilized to draw attention to a particular threat level. The well clear volume represents a spatial volume, a temporal volume, or both, of airspace which provides airborne separation comparative to a "see and avoid" region, which enables pilots to remain "well clear" from other air traffic to prevent a need for a collision avoidance maneuver by one or more aircraft. The mid-air collision volume represents a spatial volume, temporal volume, or both, of airspace, which if entered by two aircraft, will likely result in a collision.

The DAA gauge displays one or more alert bands in the first color to indicate flightpath ranges for the aircraft that will result in violation of the first separation condition and one or more alert bands in the second color to indicate flightpath ranges for the aircraft that will result in violation of the second separation condition when the aircraft is in violation of the first separation condition. In particular implementations, the DAA gauge displays one or more best path bands in a third color distinct from the first color and the second color (e.g., green). The one or more best path bands provide guidance relating to which regions to maneuver toward to regain well clear separation after violation of a well clear separation volume, a mid-air collision volume, or both.

As used herein, proximity includes or refers to measurements of distance, measurements of time, or both, unless context indicates otherwise. For example, the proximity of two aircraft can be expressed as a distance (e.g., a number of meters or feet) based on positions of the aircraft or can be expressed as time (e.g., a number of seconds) based on the positions of the aircraft and the relative velocity between the aircraft. Additionally, as used herein, a separation violation condition can occur based on the proximity of the aircraft being less than a time-based separation threshold, less than a distance-based separation threshold, or both. For example, a time-based separation threshold can be compared to a distance-based proximity by converting the time-based separation threshold to a distance using the relative velocity between the aircraft, or by converting the distance-based proximity to a time using the relative velocity between the aircraft. Also, as used herein, the term heading is used in a general sense and may refer (e.g., based on context, available data, and settings of the aircraft flight information system) to an angle between true or magnetic north and a projection of an x-axis of an aircraft onto a horizontal plane, an angular component of a velocity vector (e.g., relative to an air mass), or an angular component of a flightpath (e.g., relative to the ground).

In a particular implementation, the display includes guidance to the pilot in a manner that is consistent with the pilot's primary modes of aircraft control. The display is generated in a manner that graphically evolves the guidance format to convey information regarding a time-criticality and priority of various actions. The display also provides guidance in a manner that helps the pilot to associate and prioritize relevant information with particular navigation hazards (e.g., to indicate which other aircraft in an airspace represents the most urgent navigational hazard). By improving pilot situational awareness and decreasing pilot workload, the display supports more effective and efficient pilot decision making for complex airspace scenarios, such as airspaces that have multiple other aircraft that are navigational hazards, encounters in proximity to terrain, inclement weather, etc.

FIG. 1 is a block diagram that illustrates an example of a system 100 that includes an aircraft flight information system 102. The aircraft flight information system 102 is configured to facilitate operation of an ownship 104. The ownship 104 is an aircraft that is controlled via the aircraft flight information system 102. The term "ownship" is used herein to distinguish the aircraft controlled via the aircraft flight information system 102 from other aircraft 106 in an airspace. The aircraft flight information system 102 is configured to provide a display 108 (e.g., a user interface) that includes information descriptive of the airspace near the ownship 104. The aircraft flight information system 102 is also configured to send commands 110 to the ownship 104 based on pilot and/or autopilot flight control inputs. In FIG. 1, the aircraft flight information system 102 is a component of, or integrated within, a remote pilot station 112 (e.g., a ground control system of an unmanned aircraft) to enable remote piloting of the ownship 104, or is a component of, or integrated within, the ownship 104 or within another aircraft.

The aircraft flight information system 102 includes at least one processor 114, one or more memory devices 116, one or more input devices 118, one or more communication interfaces 120, one or more display devices 122 to display the display 108, and other output devices 124 (e.g., speakers, buzzers, lights, etc.). The memory device(s) 116, the input device(s) 118, the communication interface(s) 120, the display device(s) 122, and other output devices 124 are directly or indirectly coupled to the processor(s) 114. The memory device(s) 116 store instructions 126 that are executable by the processor(s) 114 to perform various operations associated with receiving and presenting information descriptive of an airspace around the ownship 104, presenting flight advice to a pilot, receiving and processing flight control input from the pilot, and communicating commands 110 to the ownship 104.

The communication interface 120 includes or is coupled to a transmitter 128, a receiver 130, or a combination thereof (e.g., a transceiver). The communication interface 120 is configured to enable communication with the ownship 104, the other aircraft 106, systems that gather or generate airspace data 132 descriptive of the airspace around the ownship 104, or a combination thereof. The communication can include sending and/or receiving information generated at the ownship 104 (e.g., audio, video, or sensor data), information generated at the other aircraft 106 (e.g., voice or transponder information), information generated at or collected by the aircraft flight information system 102 (e.g., commands 110), or a combination thereof. For example, the communication interface 120 is configured to receive information from the processor(s) 114 and to cause the transmitter 128 to send the information, such as a command 110, to the ownship 104. In FIG. 1, the command 110 is sent via a wireless transmission, such as via a terrestrial radiofrequency antenna 134 or via a satellite uplink between a satellite ground station antenna 136 and one or more satellites 138. In implementations in which the aircraft flight information system 102 is integrated within the ownship 104, the command 110 can be transmitted via a bus or on-board data communication architecture of the ownship 104.

The receiver 130 is configured to receive the airspace data 132 and/or other information via the terrestrial radiofrequency antenna 134, via the satellite uplink, via another source (such as a radar system or an air traffic control system), or a combination thereof. The airspace data 132 includes information such as the position, heading, velocity, altitude, and type of the ownship 104 and of each of the other aircraft 106. The airspace data 132 can also include other information, such as notices to airmen, terrain information, and weather information. The airspace data 132 is provided to the processor(s) 114, stored in the memory device(s) 116, or both.

In FIG. 1, the instructions 126 includes flight control instructions 140, flightpath estimation instructions 142, TRTA estimation instructions 144, and graphical user interface (GUI) generation instructions 146. The flight control instructions 140, the flightpath estimation instructions 142, the TRTA estimation instructions 144, and the GUI generation instructions 146 are illustrated as separate modules within the instructions 126 in FIG. 1 merely as a convenience. In some implementations, two or more modules corresponding to the flight control instructions 140, the flightpath estimation instructions 142, the TRTA estimation instructions 144, and the GUI generation instructions 146 are combined. To illustrate, the flightpath estimation instructions 142, the TRTA estimation instructions 144, and the GUI generation instructions 146 can be combined into an application, such as aircraft flight information application 920 of FIG. 9. In other implementations, the instructions 126 include different modules or more modules than are illustrated in FIG. 1. To illustrate, the flightpath estimation instructions 142 can be broken into several modules, such as a module to estimate a future flightpath of the ownship 104 based on the current flightpath of the ownship 104 and a module to determine consequences of various alternate flightpaths that the ownship 104 could take.

As another illustrative example, one or more other modules may estimate a future flightpath of the other aircraft 106 based on the current flightpath of the other aircraft 106 and determine consequences of various alternate flightpaths that the other aircraft 106 could take with respect to the ownship 104. In this illustrative example, the one or more other modules may select an estimated flightpath from the set of candidate alternate flightpaths for the other aircraft 106 for further processing. Flightpath estimation instructions 142 may estimate the future flightpaths as linear or non-linear flightpaths.

The flight control instructions 140 are executable by the processor(s) 114 to cause or enable the processor(s) 114 to receive input from a pilot via the input device(s) 118 and to generate commands (such as the command 110) for the ownship 104 based on the input. In some implementations, the flight control instructions 140 can also, or in the alternative, include an autopilot system that controls the ownship 104 autonomously or semi-autonomously (e.g., autonomously within pilot specified parameters). In some implementations, the input device(s) 118 include traditional aircraft flight input devices, such as a stick, a throttle handle, a yoke, pedals, or other aircraft inceptors. In other implementations, the input device(s) 118 include computer/gaming type input devices, such as a mouse, a keyboard, a joystick, or a game system controller. In yet other implementations, the input device(s) 118 include a combination of traditional aircraft flight input device, computer/gaming-type input device, other devices (e.g., gesture-, speech-, or motion-based controllers), or a combination thereof. The pilot can use the input device(s) 118 to directly command flight control effectors of the ownship 104, such as by moving an input device in a manner that indicates a specific aileron position or a specific roll angle. Alternatively, or in addition, the pilot can use the input device(s) 118 to designate waypoints and/or operating parameters, and the flight control instructions 140 can command flight control effectors of the ownship 104 based on the waypoint and/or operation parameters.

The flight control instructions 140 are also executable to receive and analyze the airspace data 132 or a portion thereof to determine a current (or reported) flight status of the ownship 104. The flight status of the ownship 104 includes, for example, a location of the ownship 104, a heading of the ownship 104, a velocity of the ownship 104, an altitude of the ownship 104, etc. The flight control instructions 140 generate the command 110 based on the flight status of the ownship 104, the pilot input, aircraft characteristics 148 of the ownship 104, or a combination thereof. The aircraft characteristics 148 indicate flight dynamics and operational limitations of the ownship 104, such as a maximum operational altitude, a maximum operational speed, maneuverability characteristics (e.g., a turning rate limitation, a maximum climb limitation, a stall speed, other aerodynamic limits), or a combination thereof. In addition to storing information about the ownship 104, the aircraft characteristics 148 can include similar information about the other aircraft 106.

The GUI generation instructions 146 are executable by the processor(s) 114 to cause or enable the processor(s) 114 to generate the display 108 and to provide the display 108 to the display device(s) 122. In a particular implementation, the display 108 includes a system monitor panel 150, a view point display 152, and additional information 154. The system monitor panel 150 includes a DAA gauge 158.

Entry fields, buttons, selectable icons, etc., of the system monitor panel 150 enable the pilot to change operation of the ownship 104 or the aircraft flight information system 102. For example, a waypoint entry field enables the pilot to enter an identifier of a particular waypoint and a heading entry field enables the pilot to enter a new heading. Selection of a loiter button enters or exits a loiter mode of the ownship 104. Selection of a particular icon of a plurality of icons associated with aircraft controllable by the aircraft flight information system 102 enables the user of the aircraft flight information system 102 to change which aircraft is the ownship 104.

In some implementations, the system monitor panel 150 is always a visible part of the display 108 and cannot be minimized or hidden. In other implementations, the system monitor panel 150 can be minimized or hidden. For example, in particular implementations, the system monitor panel 150 can be hidden when the view point display 152 is showing a view taken from a camera mounted on the ownship 104 as a full screen image on the display device 122. In such a situation, an altitude readout, the DAA gauge 158, and displays of other information can overlay a portion of the view so that the pilot of the ownship 104 retains situational awareness of the ownship 104.

The view point display 152 provides one or more user selectable options associated with displaying a position of the ownship 104. A first user selectable option displays a map representing a geographic area near the ownship 104 and graphical features that represent the ownship 104, the other aircraft 106, flight status information, flight advice, and other information, as described in more detail with reference to FIGS. 4-6. The content and arrangement of the graphical features can be determined based on settings 160 in the memory device(s) 126. The settings 160 include system parameters (e.g., parameters defining the well clear volume and the mid-air collision volume), pilot display preferences, and other user selectable preferences regarding presentation of information by the aircraft flight information system 102. A second user selectable option enables presentation of a video feed streaming from a video camera coupled to the ownship 104. An additional second selectable option is available for each additional video camera coupled to the ownship 104. One or more third user selectable options are selectable to depict additional views described by mission objectives.

The additional information 154 provides additional information to the user of the aircraft flight information system 102. The additional information includes a route editor that displays a current route and enables the user to set a route for the ownship 104, information about aircraft in a vicinity of the ownship (e.g., a listing of identifiers of such aircraft), and characteristics of each of the aircraft in the vicinity of the aircraft (e.g., aircraft identifier, latest update time for information regarding the aircraft, relative altitude to the ownship 104, ground speed of the aircraft, heading of the aircraft, climb rate of the aircraft, position coordinates of the aircraft, etc.)

The flightpath estimation instructions 142 and the TRTA estimation instructions 144 are executable to determine flight advice presented in the display 108. In particular, the flightpath estimation instructions 142 are configured to estimate a future flightpath of the ownship 104 and to estimate future flightpaths of the other aircraft 106 in the airspace. For example, the flightpath estimation instructions 142 can determine a current heading and current speed of each aircraft 104, 106 in the airspace from the airspace data 132 and can extrapolate the future flightpath of each aircraft in the airspace based on the respective current heading and current speed. The flightpath estimation instructions 142 can also determine a current proximity and estimated proximities between the ownship 104 and each of the other aircraft 106 based on the future flightpath of each of the aircraft 104, 106 in the airspace. The flightpath estimation instructions 142 compare the estimated proximities between the ownship 104 and each of the other aircraft 106 to various thresholds 162 (e.g., a well clear volume threshold and a mid-air collision volume threshold) to determine whether the estimated future flightpaths are expected to result in a separation violation condition. For example, the flightpath estimation instructions 142 can determine a point of nearest approach of the ownship 104 and each of the other aircraft 106 based on the future flightpaths and use the proximity at the point of nearest approach as the estimated proximity to determine whether a separation violation condition is expected to occur at a time in the future. In another example, the flightpath estimation instructions 142 can estimate the future flightpaths in time intervals (e.g., 5-second intervals) and can use the estimated proximity for each time interval to determine whether a separation violation condition is expected to occur at a time in the future.

Generally, a separation violation condition occurs if a first aircraft (e.g., the ownship 104) is less than a separation threshold (e.g., a threshold distance or a threshold time) from a second aircraft (e.g., one of the other aircraft 106). The separation threshold can be specified by the pilot (e.g., as part of the settings 160), can be specified by an organization associated with the ownship 104 or the other aircraft 106 (e.g., a military, government, or commercial organization), can be specified by a regulatory agency, or can be specified by a standards organization. In some implementations, the thresholds 162 can include multiple different separation thresholds, and the specific separation threshold used to determine whether a separation violation condition is expected to occur is determined based on conditions present when the flightpaths are estimated. For example, the specific separation threshold used can depend on weather conditions, the aircraft type of the ownship 104, the class of airspace, changes in the ownship 104 performance, the aircraft type of the other aircraft 106, mission parameters, and so forth. To illustrate, a smaller well clear volume separation threshold and mid-air collision volume threshold can be used when the ownship 104 and the other aircraft 106 are both unmanned aircraft than may be used if one of the ownship 104 or the other aircraft 106 is a manned aircraft.

If the flightpath estimation instructions 142 determine that a separation violation condition is expected to occur based on the estimated flightpaths, the TRTA estimation instructions 144 use the airspace data 132 and the aircraft characteristics 148 to estimate how long the pilot has to respond (i.e., the time remaining to act) to avoid the separation violation condition. In a particular implementation, the TRTA estimation instructions 144 determine, based on the airspace data 132 and the aircraft characteristics 148, ranges of travel that will result in well clear separation violations and ranges of travel that will result in mid-air collision separation violations for display by the DAA gauge 158 and a compass rose presented by the viewpoint display 152, and one or more navigation alert regions for display on the viewpoint display 152. As explained in more detail with reference to FIG. 2, the navigation alert region is an area in which the separation violation condition will occur (e.g., will be unavoidable) if the ownship 104 flies into the navigation alert region and the other aircraft 106 follows the future flightpath estimated by the flightpath estimation instructions 142. The TRTA estimation instructions 144 provide data to the GUI generation instructions 146 to cause the TRTA, a graphical feature representing the navigation alert region, other information, or a combination thereof, to be represented in the display 108.

In some implementations, the flightpath estimation instructions 142 are also configured to determine one or more alternate flightpaths for the ownship 104 and to determine whether each of the one or more alternate flightpaths would result in a separation violation condition. The one or more alternate flightpaths can be determined based on a current or reported flight status of the ownship 104 and the aircraft characteristics 148. For example, a particular alternate flightpath can be determined based on a current heading of the ownship 104 and a maximum turning limitation of the ownship 104. If any of the alternate flightpaths determined by the flightpath estimation instructions 142 would result in a separation violation condition, the flightpath estimation instructions 142 can provide data to the GUI generation instructions 146 to generate and display flight advice in the display 108. To illustrate, graphical features (e.g., one or more alert bands of the DAA gauge 158 and one or more alert bands displayed on the compass rose on the map of the viewpoint display 152) can be displayed to indicate to the pilot that the pilot should not modify the flightpath of the ownship 104 to correspond to the alternate flightpath(s) since this modification would result in a separation violation condition. The one or more alert bands indicate non-allowed steering directions where the pilot should not direct the ownship 104. The one or more alert bands are indicated in warning colors (e.g., yellow or red) that indicate a severity of a separation condition violation associated with the one or more alert bands.

As another illustration, graphical features (e.g., one or more advice bands of the DAA gauge 158 and one or more advice bands displayed on the compass rose on the map of the viewpoint display 152) can be displayed to indicate to the pilot that the pilot should modify the flightpath of the ownship 104 to correspond to the alternate flightpath(s) since this modification would result in regaining a well clear separation condition. The one or more advice bands that indicate where the pilot should direct the ownship 104 toward can be indicated in a color (e.g., green) distinct from warning colors (e.g., yellow and red) associated with the alert bands that indicate non-allowed steering directions for the ownship 104.

In a particular implementation, the flightpath estimation instructions 142, the TRTA estimation instructions 144, or both, can provide data to the flight control instructions 140 to limit operations that the pilot can perform based on a projected separation violation condition. For example, after the TRTA estimation instructions 144 identify a navigation alert region, the TRTA estimation instructions 144 can provide data identifying boundaries of the navigation alert region to the flight control instructions 140, and the flight control instructions 140 can prevent the pilot from designating a waypoint for the ownship 104 within the navigation alert region. For example, if the pilot provides input that designates a waypoint for the ownship 104, the command 110 can be generated and sent to the ownship 104 based on a determination that the waypoint is not located in the navigation alert region. Alternatively, the flight control instructions 140 can allow the pilot to designate the waypoint within the navigation alert region, but may require the pilot to perform one or more additional steps, such as a confirmation that the pilot understand that the waypoint is within the navigation alert region. For example, based on determining that the waypoint is within the navigation alert region, the aircraft flight information system 102 can generate output advising the pilot that the waypoint is within the navigation alert region, and await confirmation from the pilot before setting the waypoint. Thus, the aircraft flight information system 102 generates the display 108 in a manner that is consistent with the pilot's primary modes of aircraft control.

While FIG. 1 illustrates control of a single ownship 104, in some implementations, the aircraft flight information system 102 is associated with controlling more than one ownship 104. The aircraft flight information system 102 can simultaneously control all aircraft of a group of aircraft by sending one or more commands 110 to an address associated with the group of aircraft so that each aircraft of the group implements the one or more commands 110. Particular separation conditions for aircraft of the group are implemented when the aircraft of the group are operated in close proximity to each other. For example, the well clear separation condition is ignored and the mid-air collision volume is less than mid-air collision volume for the other aircraft 106 not included in the group. Information associated with a representative aircraft of the group is provided to the display 108 of the display device 122 along with a graphic feature indicating that the aircraft flight information system 102 is controlling the group and not only the representative aircraft. The aircraft flight information system 102 is also able to individually control particular aircraft of the group of aircraft. To control a single aircraft of the group of aircraft, the pilot using the aircraft flight information system 102 selects a particular aircraft of aircraft controllable by the aircraft flight information system 102 as the ownship 104. Information associated with the ownship 104 is provided to the display 108 of the display device 122, and the graphic feature indicating control of the group is removed. Graphical features (e.g., aircraft icons in a particular color (e.g., blue when there is no separation condition violation with the ownship 104 and purple when there is a separation violation condition with the ownship 104)) and information are displayed for aircraft of the group to provide the pilot with situational awareness of the aircraft of the group when the pilot is controlling a single aircraft of the group.

The display 108 is generated to graphically evolve the guidance format to convey information regarding the time-criticality (and in-turn priority) of various actions. For example, the arrangement of graphical features of the display 108 and display formats (e.g., colors) of the graphical features are updated as conditions in the airspace change. For example, graphics associated with potential well clear volume violations are depicted in the color yellow for the ownship and a particular aircraft of the aircraft 106. When a potential well clear volume violation becomes an actual well clear volume violation, the graphics are changed to red, and if the mid-air collision volume is violated, the graphics flash red. The display 108 also provides guidance in a manner that helps the pilot to associate and prioritize relevant information with particular navigation hazards, e.g., to indicate which other aircraft 106 in an airspace is the most urgent navigational hazard. By improving pilot situational awareness and decreasing pilot workload, the aircraft flight information system 102 supports more effective and efficient pilot decision making for complex airspace scenarios, such as airspaces that have multiple other aircraft that are navigational hazards, encounters in proximity to terrain, inclement weather, etc.

Figure 2:
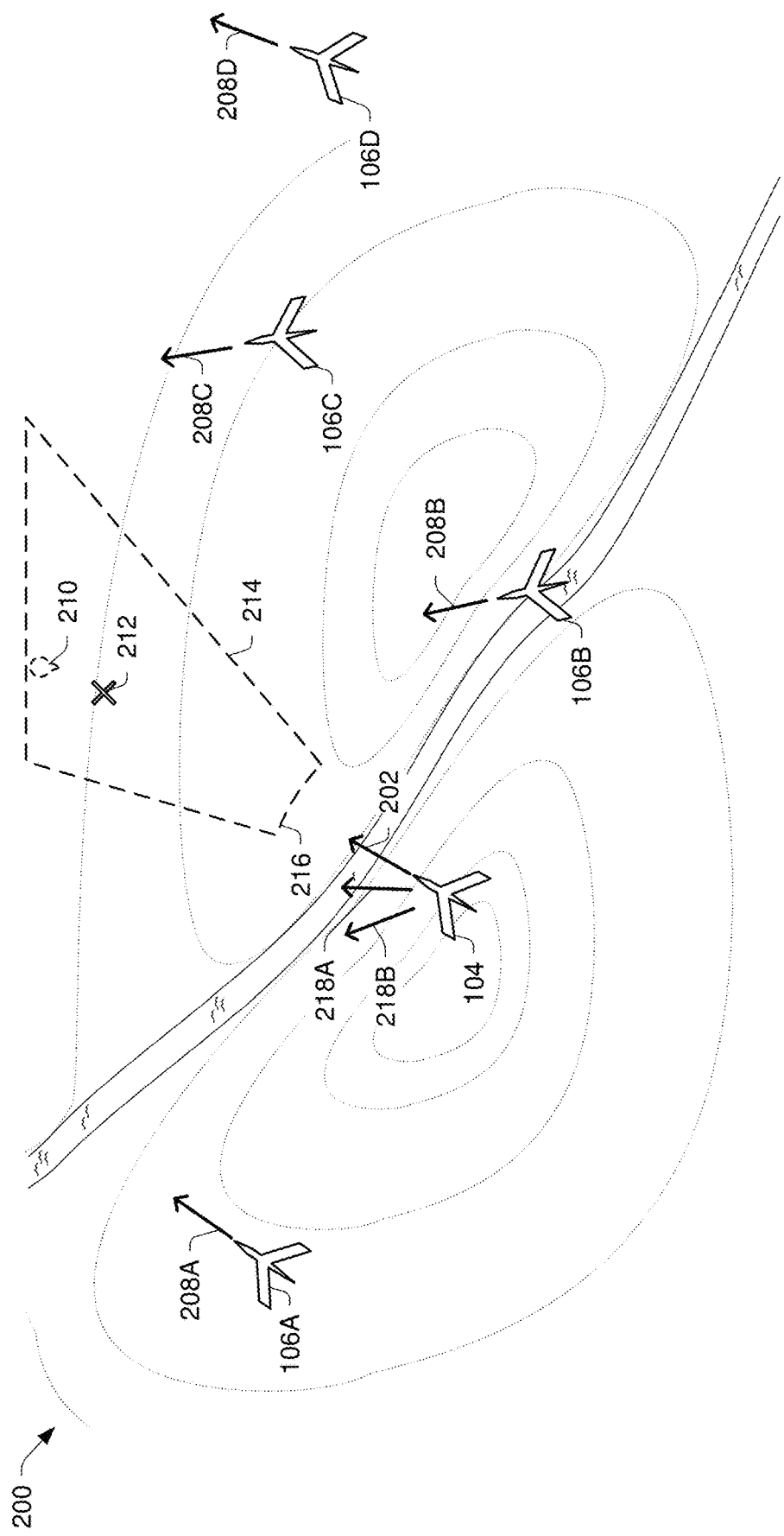
FIG. 2 is a diagram that illustrates an example of an airspace in which multiple aircraft are present.

FIG. 2 is a diagram that illustrates an example of an airspace 200 in which multiple aircraft are present. The aircraft include the ownship 104 and multiple other aircraft 106, including aircraft 106A, 106B, 106C, and 106D. FIG. 2 also illustrates a flightpath of each aircraft 104, 106 in the airspace 200. For example, the ownship 104 is associated with a flightpath 202, the aircraft 106A is associated with a flightpath 208A, the aircraft 106B is associated with a flightpath 208B, the aircraft 106C is associated with a flightpath 208C, and the aircraft 106D is associated with a flightpath 208D. In the example illustrated in FIG. 2, the flightpath 202 of the ownship 104 is toward a waypoint 210.

Extrapolating (e.g., linearly projecting) the flightpath 202 of the ownship 104 and the flightpath 208B of the aircraft 106B shows that an estimated flightpath of the ownship 104 and an estimated flightpath of the aircraft 106B intersect at a projected intersection location 212. In other implementations, the estimated flightpath is based on a nonlinear projection. The projected intersection location 212 is within a box identifying boundaries of a navigation alert region 214. The navigation alert region 214 is an area in which a separation violation condition will occur if the ownship 104 follows the estimated flightpath 202 and the aircraft 106B follows the estimated flightpath 208B. Thus, to avoid a separation violation condition, the flightpath 202 of the ownship 104 should be changed to avoid passing the closest boundary 216 of the navigation alert region 214. As explained further with reference to FIGS. 5 and 6, a map view of the viewpoint display 152 displays a graphical feature (e.g., a color-coded geometric shape) in the display 108 to identify the boundaries of the navigation alert region 214. Navigation alert regions 214 can also be generated and concurrently displayed for one or more of the other aircraft 106 for which a separation violation condition is determined.

FIG. 2 also illustrates alternate flightpaths 218, including alternate flightpaths 218A and 218B, to which the ownship 104 could turn to avoid entering the navigation alert region 214. However, in FIG. 2, the alternate flightpaths 218 represent alternate flightpaths that the ownship 104 should avoid. The alternate flightpaths 218 are both toward the port side of the ownship 104, and the aircraft 106A is to the port side of the ownship 104. Projecting (e.g., extrapolating) a future flightpath of the aircraft 106A along its current flightpath 208A, and projecting (e.g., extrapolating) a future flightpath of the ownship 104 along either of the alternate flightpaths 218 or any flightpath between the alternate flightpaths 218 is expected to cause a separation violation condition between the ownship 104 and the aircraft 106A. As explained further with reference to FIGS. 3-6, the aircraft flight information system 102 of FIG. 1 can include graphical features (e.g., one or more alert bands in the DAA gauge 158 and one or more alert bands displayed on a compass rose on a map of the viewpoint display 152) in the display 108 to identify flightpath ranges that the ownship 104 should avoid. In some implementations, the DAA gauge 158 (e.g., the DAA gauge 158 depicted in FIG. 3C) and the compass rose include graphical features (e.g., one or more advice bands) that indicate flightpath ranges of that the ownship 104 should maneuver toward.

Figure 3A:
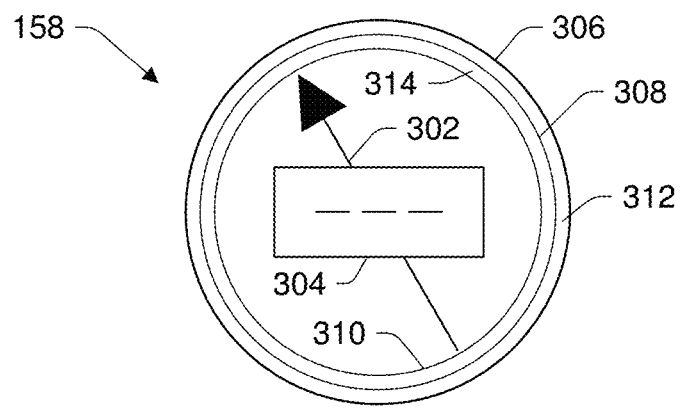
FIGS. 3A, 3B, and 3C are diagrams that illustrates examples of a DAA gauge for an aircraft that provides information regarding an airspace for the aircraft.
Figure 3B:
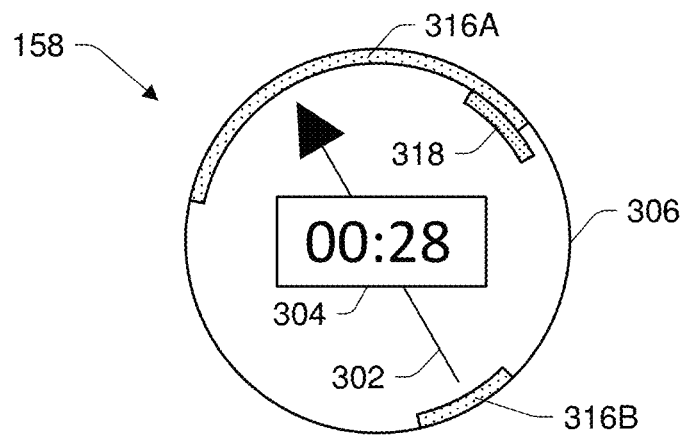
Figure 3C:
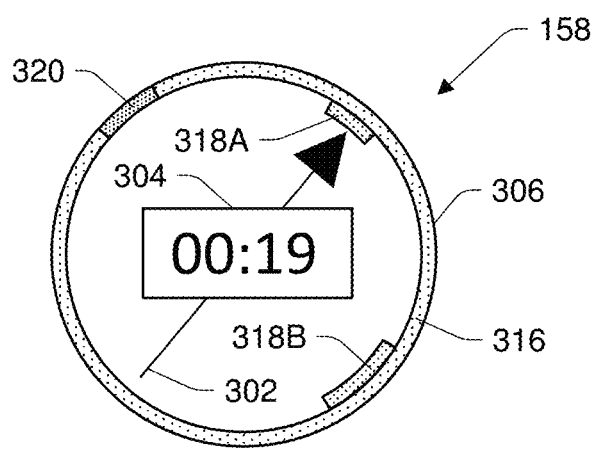

FIGS. 3A-3C depict information presentable by the DAA gauge 158 for particular conditions. The DAA gauge 158 is part of the system monitor panel 150 of the display 108 depicted in FIG. 1. The DAA gauge 158 includes a flightpath indicator 302, a TRTA countdown timer 304, and a gauge outline 306. The flightpath indicator 302 is an arrow that indicates a current flightpath of the ownship 104 controlled by the aircraft flight information system 102.

FIG. 3A depicts the DAA gauge 158 for conditions when no other aircraft 106 are in a vicinity of the ownship 104 associated with the DAA gauge 158 or when a flightpath or a potential flightpath of the ownship 104 and flightpaths of one or more other aircraft 106 are not projected to result in a separation violation. The TRTA countdown timer 304 displays dashes, or is blank, to indicate that the ownship 104 is not on a course that will result in a separation condition violation.

In some implementations, such as the implementation depicted in FIG. 3A, the DAA gauge displays a first inner circle 308, a second inner circle 310, or both. A first annular region 312 is located between the gauge outline 306 and the first inner circle 308. A second annular region 314 is located between the first inner circle 308 and the second inner circle 310. Alert bands associated with violations of separation conditions are displayed in the first annular region 312, the second annular region 314, or both. In other implementations, such as the implementations depicted in FIGS. 3B and 3C, the DAA gauge 158 does not display the first inner circle 308 and the second inner circle 310, though alert bands associated with violations of separation conditions are displayed in the first annular region, the second annular region, or both, as if the first inner circle 308 and second inner circle 310 were present.

FIG. 3B depicts the DAA gauge 158 for conditions where two first alert bands 316 and a second alert band 318 are presented. For other conditions, no first alert bands 316, a different number of first alert bands 316, no second alert bands 318, a different number of second alert bands 318, or combinations thereof, are presented. First alert bands 316 are presented as one or more arcs in a first color (e.g., yellow) in the first annular region 312 of the DAA gauge 158. The first alert bands 316 represent ranges of directions of travel of the ownship 104 projected to result in violation of a first separation condition (e.g., violation of the well clear volume).

Second alert bands 318 are presented as one or more arcs in a second color distinct from the first color (e.g., red) in the second annular region 314 of the DAA gauge 158. The second alert bands 318 represent ranges of directions of travel of the ownship 104 projected to result in violation of a second separation condition (e.g., violation of the mid-air collision volume) during a first separation condition violation.

In the implementation depicted in FIG. 3B, the flightpath indicator 302 is pointed toward the first alert band 316A. When the flightpath indicator 302 is pointed toward one of the first alert bands 316, the TRTA countdown timer 304 displays an amount of time remaining to change course of the ownship 104 to avoid violation of the first separation condition. A color of the numbers of the TRTA countdown timer 304, or a background color of the TRTA countdown timer 304, can be presented in the first color to indicate that continuation of the ownship 104 on the present flightpath indicated by the flightpath indicator 302 will result in the first separation condition violation. Regions of the DAA gauge 158 that do not have first alert bands 316 or second alert bands 318 indicate directions to turn toward to avoid violations of one or more separation conditions. In some situations, there may be no regions of the DAA gauge 158 that do not have first alert bands 316, second alert bands 318, or combinations thereof.

The amount of time displayed in the TRTA countdown timer 304 is based on calculated separation distances between aircraft, aircraft speeds, maneuverability characteristics of the ownship 104, or combinations thereof. As the amount of time displayed by the TRTA countdown timer 304 decreases without the pilot initiating corrective action for the ownship 104, a severity of a maneuver for the ownship 104 to avoid the first separation condition violation increases.

FIG. 3C depicts the DAA gauge 158 for conditions where a first alert band 316 and two second alert bands 318 are presented. Presence of the second alert bands 318 indicates that violation of a first separation condition (e.g., the well clear separation condition) has occurred. The flightpath indicator 302 is pointed toward the second alert bands 318A. When the flightpath indicator 302 is pointed toward one of the second alert bands 318, the TRTA countdown timer 304 displays an amount of time remaining to change course to avoid violation of the second separation condition. A color of the numbers of the TRTA countdown timer 304, or a background color of the TRTA countdown timer 304, can be presented in the second color to indicate that continuation of the ownship 104 on the present flightpath indicated by the flightpath indicator 302 will result in the second separation condition violation. As the amount of time displayed by the TRTA countdown timer 304 decreases without the pilot initiating corrective action for the ownship 104, a severity of a maneuver for the ownship 104 to avoid the second separation condition violation increases.

In the implementation depicted in FIG. 3C, the DAA gauge 158 includes an advice band 320. One or more advice bands 320 are presented as one or more arcs in the first annular region 312, though in other implementations, the one or more advice bands 320 are presented in the second annular region 314 or in a third annular region distinct from the first annular region 312 and the second annular region 314. The advice band 320 is presented in a color that is distinct from the first color and the second color (e.g., green). The advice band 320 represents a calculated range of directions for the ownship 104 to maneuver to that will result in regaining the first separation condition between the ownship 104 and one or more other aircraft 106 (e.g., the well clear separation condition).

Figure 4:
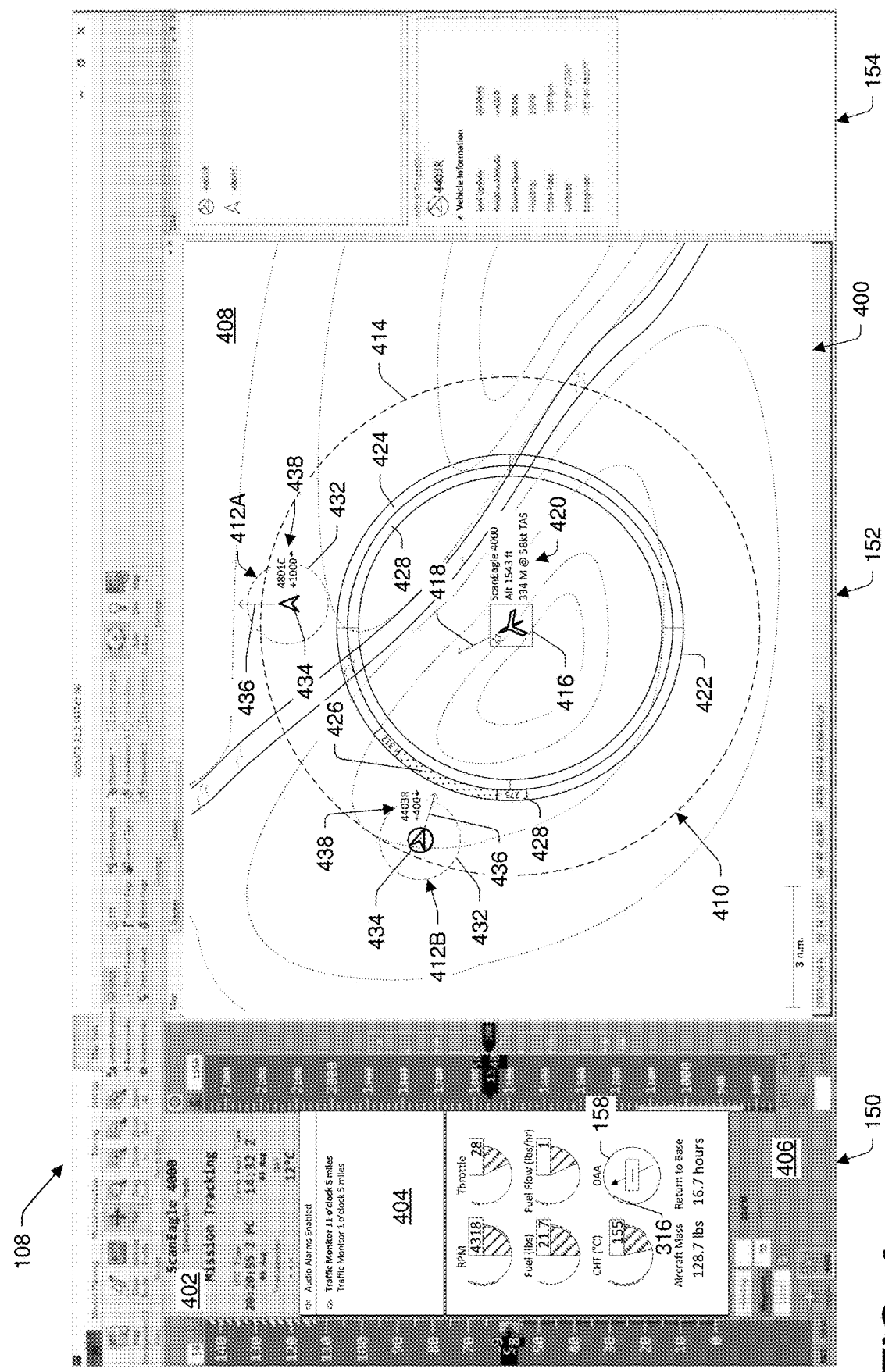
FIG. 4 is a diagram that illustrates a first example of an aircraft flight information display for an aircraft that provides information regarding a particular airspace around the aircraft.
Figure 5:
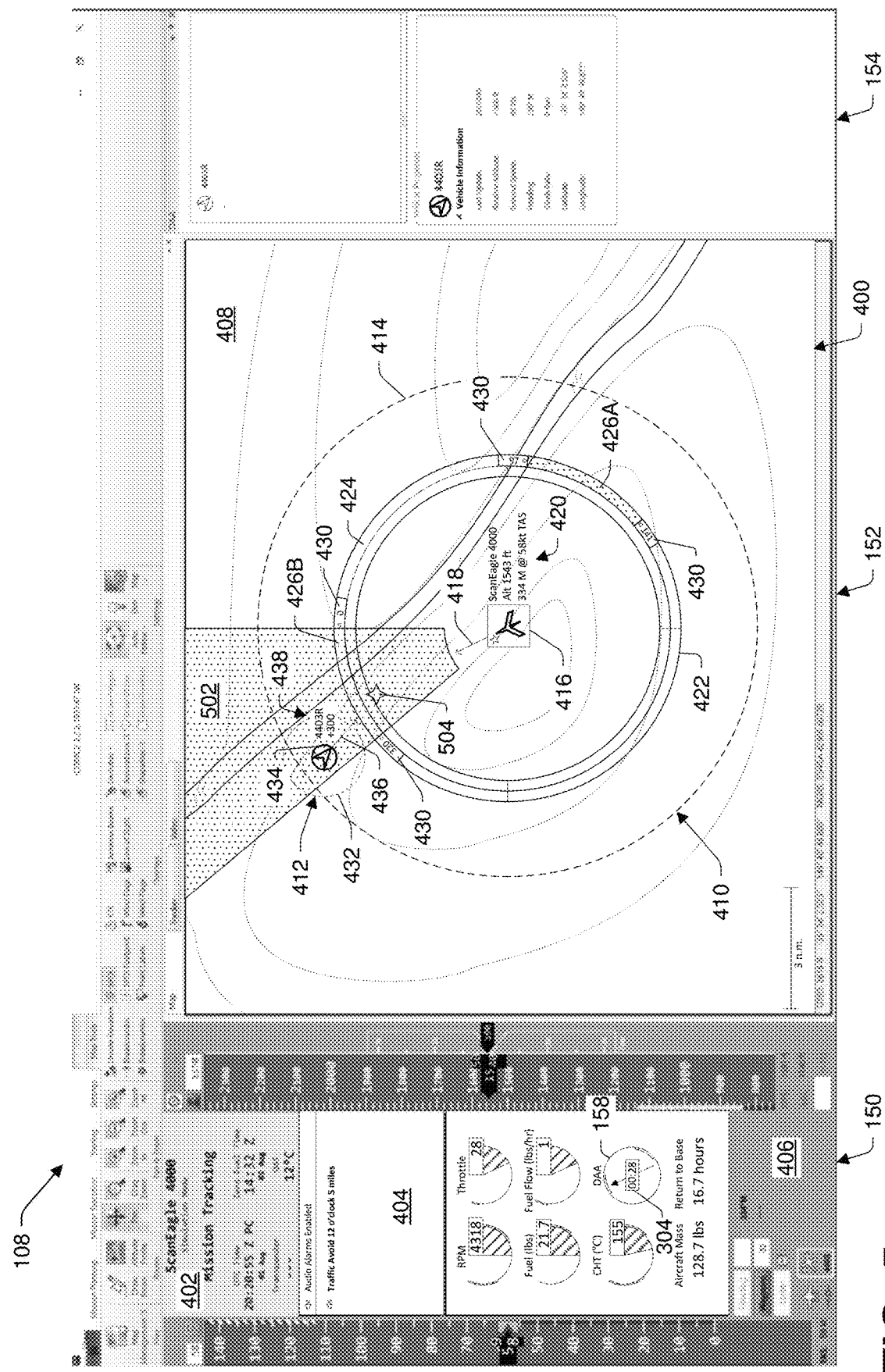
FIG. 5 is a diagram that illustrates a second example of an aircraft flight information display for an aircraft that provides information regarding a particular airspace around the aircraft.
Figure 6:
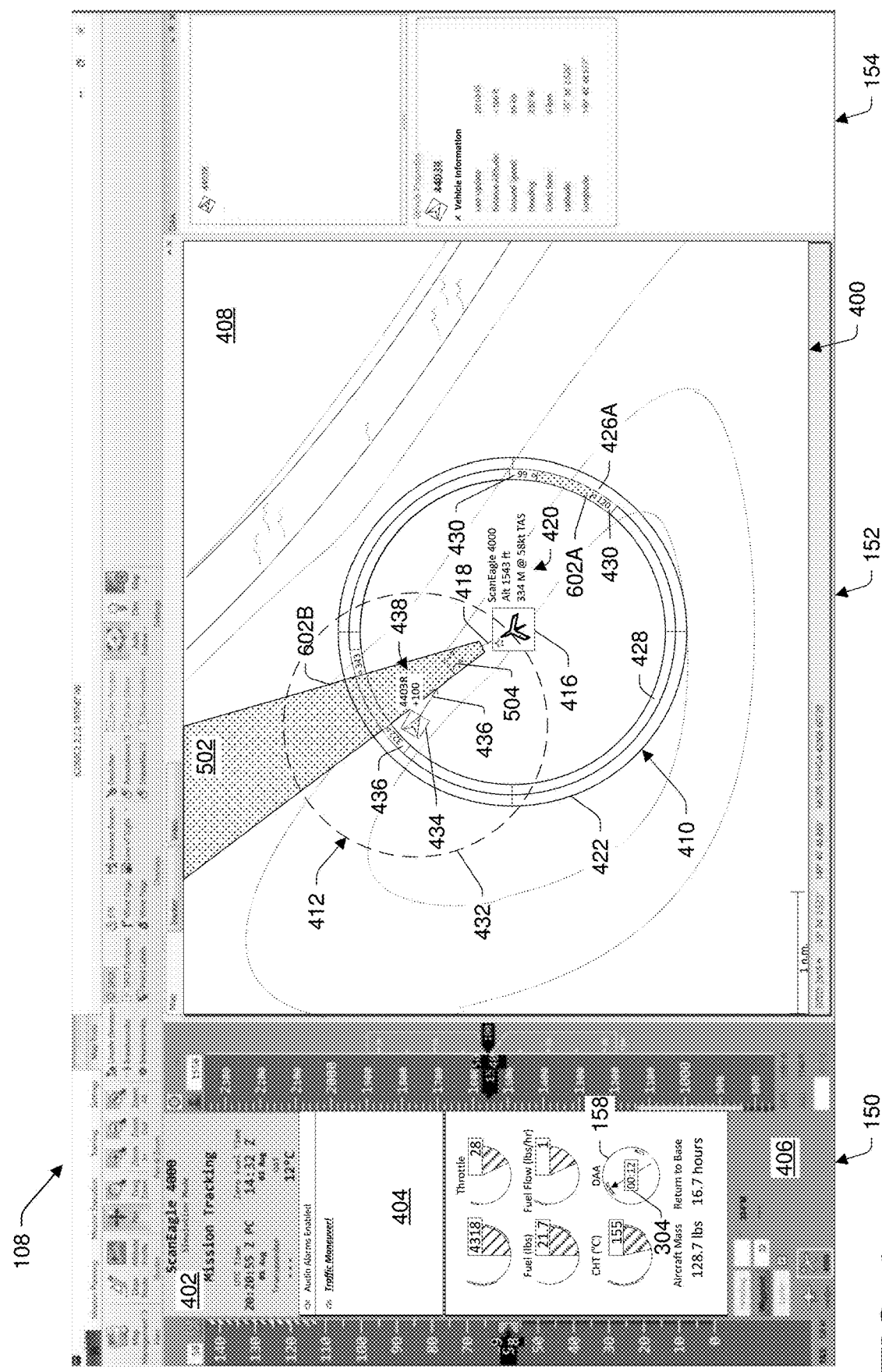
FIG. 6 is a diagram that illustrates a third example of an aircraft flight information display for an aircraft that provides information regarding a particular airspace around the aircraft.

FIGS. 4-6 illustrate examples of aircraft flight information displays (e.g., examples of the display 108 of FIG. 1) for various airspace conditions. In each of FIGS. 4-6, the display 108 includes the system monitor panel 150, a viewpoint display 152, and additional information 154.

The system monitor panel 150 includes an information section 402, a warning and alarm section 404, and an instrument section 406. In other implementations, the system monitor panel 150 includes additional sections, other sections, fewer sections, or combinations thereof.

The information section 402 displays information about the ownship 104 currently controlled by the aircraft flight information system 102 and current conditions (e.g., date and time, transponder operation status (e.g., off or on), estimated zero fuel time, outside air temperature, etc.). The warning and alarm section 404 displays information associated with present warnings and alarm conditions detected by the aircraft flight information system 102. When audio alarms are enabled, an indicator sound, a reading of an alert, or both, depending on the setting 160 of the aircraft flight information system 102, is presented by an output device 124 (e.g., a speaker) when a warning or alarm condition is detected by the aircraft flight information system 102. The warnings and alarms are associated with other aircraft (e.g., notices of the other aircraft in the airspace and warnings and alarms associated with separation conditions) and conditions associated with the ownship (e.g., a warning or alarm associated with a low fuel condition or low battery power for a battery powered aircraft).

The instrument section 406 includes a set of gauges, readouts, and inputs associated with flying the ownship 104. In the implementations depicted in FIGS. 4-6, the instrument section 406 includes an air speed indicator, an altimeter, a rate of change in altitude indicator, a tachometer, a throttle gauge, a fuel gauge, a fuel flow gauge, a cylinder head temperature (CHT) gauge, the DAA gauge 158, a heading readout, a waypoint indicator, and a loiter indicator. In other implementations, the instrument section 406 includes a different set of gauges, readouts, and inputs that include the same number of items as in the set, different items than in the set, additional items not present in the set, fewer items than in the set, or combinations thereof.

The viewpoint displays 152 depicted in FIGS. 4-6 depict map views 400 of a vicinity near the ownship 104. Graphical features overlay a map 408 (e.g., a photograph or other type of image of a region) and represent various aspects of an airspace, the ownship 104, and other aircraft 106. Unless indicated otherwise, the graphical features overlaying the map 408 are semi-transparent to allow visibility of the map 408 through each graphical feature, including for example information boxes, geometric shapes representing navigation alert regions, advice bands, etc. The graphical features include graphical features 410 associated with the ownship 104, graphical features 412 associated with the other aircraft 106, a color-coded geometric shape 502 representing a navigation alert region (e.g., as depicted in FIG. 5 and FIG. 6), and an intersection icon 504 representing a projected intersection location of a particular aircraft with the ownship 104 (e.g., as depicted in FIG. 5 and FIG. 6).

The graphical features 410 associated with the ownship 104 includes a coverage area indicator 414, an icon 416 for the ownship 104, a flightpath indicator 418, ownship text 420, and a compass rose 422 centered on the ownship 104. The coverage area indicator 414 surrounds a region for which the aircraft flight information system 102 displays data associated with the other aircraft 106. When a scale of the map 408 is changed such that all areas of the map 408 are included in the region for which the aircraft flight information system 102 displays data associated with the other aircraft 106, the coverage area indicator 414 is not displayed. For example, no coverage area indicator 414 is depicted in FIG. 6 because all portions of the map 408 are part of the coverage area.

The icon 416 includes an outline shape (i.e., a box in FIGS. 4-6) surrounding an aircraft icon that represents the ownship 104, and a control indicator in the outline shape (i.e., a star in FIGS. 4-6) that indicates the particular aircraft controlled by the aircraft flight information system 102. In some implementations, the aircraft icon and the control indicator are not semitransparent. The flightpath indicator 418 extends from the outline shape and indicates the flightpath of the ownship 104. When the ownship 104 changes to a new heading, the aircraft icon and the flightpath indicator are rotated to reflect the new heading. A position of the control indicator can be moved when the heading of the ownship 104 changes so that the aircraft icon does not overlap the control indicator.

The ownship text 420 presents information associated with the ownship 104. For example, the ownship text 420 presents an aircraft identifier of the ownship 104 (i.e., ScanEagle 4000), the altitude of the ownship 104, the heading of the ownship 104, and the airspeed of the ownship 104. In other implementations, the ownship text 420 includes additional information, less information, different information, or combinations thereof. The aircraft flight information system 102 changes the position of the ownship text 420 when needed so that the flightpath indicator 418 does not pass through the ownship text 420. In some implementations, the ownship text 420 includes a time remaining to act to avoid a separation condition violation as presented in the TRTA countdown timer 304 of the DAA gauge 158 when the TRTA countdown timer 304 displays numeric values.

A color of the aircraft icon of the ownship icon 416 is changed to represent separation condition status associated with the ownship 104. For example, the color of the ownship icon is green when no travel flightpaths for the ownship 104 are projected to result in a separation violation condition. When one or more flightpaths of the ownship 104 will result in the first separation condition violation (e.g., violation of the well clear separation condition), the aircraft icon is changed to yellow to warn the pilot of a potential to violate the first separation condition. When the ownship is in violation of the first separation condition (i.e., within the well clear volume of another aircraft), the aircraft icon is changed to red to indicate to the pilot that the first separation condition is violated and to warn of a potential to violate the second separation condition (e.g., the mid-air collision separation condition).

The compass rose 422 includes an outer circle, a center circle, an inner circle, and four direction markers that indicate the directions north, south, east and west. All or a portion of one or more of the direction markers can be absent when the one or more markers would overlay other information. Similar to the DAA gauge 158, a first annular region 424 between the outer circle and the center circle is used to display one or more alert bands 426 indicating flightpath ranges for the ownship 104 that would result in a first separation violation conditions and a second annular region 428 between the central circle and the inner circle is used to display one or more alert bands 602, as depicted in FIG. 6, indicating flightpath ranges for the ownship 104 that would result in the second separation condition violation responsive to an existent first separation condition violation. In addition, when there is sufficient space in the first annular region 424, the second annular region 428, or both, the compass rose 422 includes identifier regions 430 associated with the alert bands 426, 602. Numeric values of range limits of the alert bands 426, 602 represented in the annular regions 424, 428 are presented in the identifier regions 430.

The graphical features 412 representing the other aircraft 106 include a well clear volume indicator 432, an icon 434 for the other aircraft 106, a flightpath indicator 436, and other aircraft text 438. The well clear volume indicator 432 indicates an outer extent of a well clear volume associated with the other aircraft 106.

The icon 434 includes an aircraft icon and, when the other aircraft 106 is associated with a potential separation condition violation or a separation condition violation, an outline shape surrounding the aircraft icon for emphasis. The flightpath indicator 436 extends from the icon 434. When the other aircraft 106 changes to a new heading, the icon 434 and the flightpath indicator 436 are rotated to reflect the new heading. In some implementations, the aircraft icon of the icon 434 is not semitransparent.

A color of the aircraft icon indicates a hazard level associated with the other aircraft 106 to the pilot using the aircraft flight information system 102. For example, the other aircraft 106 associated with graphic feature 412A depicted in FIG. 4 is not associated with any potential or existent separation condition violation, so the aircraft icon of the icon 434 is shown in a particular color (e.g., white) with no outline shape as an indication that the other aircraft represents no immediate navigational hazard. The other aircraft 106 associated with graphic feature 412A and similarly depicted other aircraft 106 are associated with a lowest level of navigation hazard.

As a further example, the other aircraft 106 associated with graphic feature 412B depicted in FIG. 4 is associated with a potential separation condition violation (e.g., a potential violation of the well clear separation condition if the flightpath of the ownship 104 changes to a flightpath included in the range indicated by the alert band 426 in the compass rose 422), so the aircraft icon of the icon 434 includes a circular outline shape and the aircraft icon is presented in a first color (e.g., yellow) as a warning to the pilot using the aircraft flight information system 102 that the other aircraft 106 is associated with a potential well clear separation condition violation and is a potential navigation hazard. The other aircraft 106 associated with graphic feature 412B and similarly depicted other aircraft 106 are associated with a medium level of navigation hazard.

As a further example, the other aircraft 106 associated with graphic feature 412 depicted in FIG. 6 is associated with a violation of a separation condition (e.g., violation of the well clear separation condition), so the aircraft icon of the icon 434 includes a square outline shape and the aircraft icon is presented in a second color (e.g., red) as a warning to the pilot using the aircraft flight information system 102 that the other aircraft 106 is associated with a well clear separation condition violation and is a high navigation hazard. The other aircraft 106 associated with graphic feature 412 and similarly depicted other aircraft 106 are associated with a high level of navigation hazard. Should the other aircraft 106 associated with graphic feature 412 and the ownship 104 violate the mid-air collision volume separation condition, the aircraft icon 343, the outline shape, the aircraft icon of the icon 416 for the ownship 104, or combinations thereof, are indicated in red and flash on and off to indicate a highest level of navigation hazard.

The other aircraft text 438 of the graphic feature 412 presents information associated with the other aircraft 106. For example, the other aircraft text 438 presents an aircraft identifier of the other aircraft 106 (e.g., 4403R for the other aircraft 106 associated with the graphic feature 412B depicted in FIG. 4), a relative altitude of the other aircraft 106 to the altitude of the ownship 104, and a change indicator that indicates whether the relative altitude of the other aircraft 106 to the ownship 104 is increasing (i.e., an up arrow) or decreasing (i.e., a down arrow). A position of the other aircraft text 438 is movable relative to the icon 434 by the aircraft flight information system 102 to avoid overlap of the other aircraft text 438 with the flightpath indicator 436.

The additional information 154 includes information associated with the other aircraft 106 in the vicinity of the ownship 104. A first window may include representation of icons 434 presented on the map 408 for each of the other aircraft 106 shown on the map and the aircraft identifier for each of the other aircraft 106 shown on the map 408. Additional windows are presented for each of the other aircraft 106 associated with an alert band 426, 602 represented in the compass rose 422 presented in the view point display 152.

An additional window for a particular aircraft of the other aircraft 106 includes a representation of the icon 434 shown on the map 408, the aircraft identifier, and aircraft information for the particular aircraft. The aircraft information includes an update time for information associated with the particular aircraft, a relative altitude of the particular aircraft to the ownship 104, a ground speed of the particular aircraft, a heading of the particular aircraft, a climb rate of the particular aircraft, and a location of the particular aircraft. In other implementations, the aircraft information includes different information, more information, less information, or combinations thereof.

FIG. 4 is an example of the display 108 when two other aircraft 106, which are represented in FIG. 4 by graphic features 412A and 412B, are in a vicinity of the ownship 104, which is represented in FIG. 4 by graphic feature 410. Information regarding the other aircraft 106 is presented in the warning and alarm section 404 of the system monitor panel 150, in the DAA gauge 158 in the system monitor panel 150 when one or more potential or existent separation condition violations are due to the other aircraft 106, in the view point display 152, and in the additional information 154.

The other aircraft 106 associated with graphic feature 412A is not associated with any separation condition violation. Information and graphics for the other aircraft 106 associated with the graphic feature 412A are not emphasized as an indication that a navigation threat level associated with the other aircraft 106 is at the lowest level.

The other aircraft 106 associated with graphic feature 412B is associated with a potential well clear separation condition violation. For the other aircraft 106 associated with graphic feature 412B, the aircraft flight information system 102 determined that, should the flightpath of the ownship 104, which is associated with the graphical features 410, change heading from the current flightpath of 334 degrees to a flightpath in the range from 275 degrees to 312 degrees, a well clear separation condition will occur. Due to the presence of the potential well clear volume separation condition violation, the aircraft icon of the ownship icon 416 is depicted in yellow as a warning to the pilot using the aircraft flight information system 102 that a medium level navigational hazard exists.

In response to the potential well clear volume separation condition violation, the DAA gauge 158 displays a first alert band 316 from 275 degrees to 312 degrees. A similar alert band 426 is displayed in the compass rose 422 displayed in the viewpoint display 152 along with the angles 275 and 312 displayed as numerals in the identifier regions 430. Additionally, information in the warning and alarm section 404 for the other aircraft 106 associated with the graphic features 412B and graphics for the other aircraft 106 associated with the graphic features 412B are emphasized as an indication that a medium level navigation threat is associated with the other aircraft 106. For example, the information for the other aircraft 106 associated with graphic feature 412B presented in the warning and alarm section 404 is shown or highlighted in yellow, presented in bold lettering, or both, and the aircraft icon 434 of the graphical feature 412B is depicted in the color yellow.

FIG. 5 is an example of the display 108 when one other aircraft 106, which is represented in FIG. 5 by graphic features 412, is in a vicinity of the ownship 104, which is in FIG. 5 by the icon 416. Information regarding the other aircraft 106 is presented in the warning and alarm section 404 of the system monitor panel 150, in the view point display 152, and in the additional information 154.

The other aircraft 106 associated with graphic feature 412 is associated with two potential well clear separation condition violations. The aircraft flight information system 102 determined that two alert bands 426A, 426B are associated with the other aircraft 106 and depicts the alert bands 426A, 426B in the first annular region 424 of the compass rose 422. Corresponding information is presented in the DAA gauge 158 in the instrument section 406. Numeric text of range limits of the alert band 426A (e.g., 97 and 141) and numeric text of range limits of the alert band 426B (e.g., 0 and 320) are presented in identifier regions 430 of the compass rose 422. In response to detection of potential well clear separation condition violations, the aircraft icon of the icon 416 and the icon 434 associated with the other aircraft 106 are displayed in the color yellow to indicate to the pilot of the aircraft flight information system 102 that potential navigational threats are present.

Since the current flightpath of the aircraft of 334 degrees is included in the range of non-allowed steering directions indicated by the alert band 426B, a navigation alert region 502 is displayed, the intersection icon 504 where the other aircraft 106 and the ownship 104 are predicted to meet is displayed, and the TRTA countdown timer 304 of the DAA gauge 158 displays a countdown of time remaining to change course before violation of the well clear separation condition. Presence of the navigation alert region 502 and the intersection icon 504 indicate to the pilot using the aircraft flight information system 102 that the potential navigational threat is a serious threat that requires corrective action. The navigation alert region 502 is displayed in the color yellow and can include alternating stripes of different transparency so that the navigation alert region 502 is easily distinguished from the first alert band 426B in the compass rose 422, which is displayed in the navigation alert region 502. The intersection icon 504 is presented in yellow and is solid (i.e., not semitransparent). In some implementations, the time remaining to act displayed in the time remaining to act countdown timer 304 is also displayed in the ownship text 420, in the aircraft information panel 154, or both, in yellow or highlighted in yellow.

FIG. 6 is an example of the display 108 when one other aircraft 106, which is represented in FIG. 6 by graphic features 412, is in a vicinity of the ownship 104, which is represented in FIG. 6 by the icon 416. Information regarding the other aircraft 106 is presented in the warning and alarm section 404 of the system monitor panel 150, in the view point display 152, and in the additional information 154.

The other aircraft 106 associated with graphic feature 412 is in the well clear volume indicated by the well clear volume indicator 432 associated with the other aircraft 106. Thus, the well clear volume separation condition is violated. Additionally, the aircraft flight information system 102 determined that two alert bands 602A, 602B associated with violation of the mid-air collision volume separation condition are associated with the other aircraft 106 and depicts the alert bands 602A, 602B in the second annular region 428 of the compass rose 422. Corresponding information is presented in the DAA gauge 158 in the instrument section 406. Numeric text of range limits of the alert band 602A (e.g., 99 and 120) and numeric text of range limits of the alert band 426B (e.g., 322 and 343) are presented in identifier regions 430 of the compass rose 422.

In response to violation of the well clear separation condition, the aircraft icon of the icon 416 and the icon 434 associated with the other aircraft 106 are displayed in the color red to indicate to the pilot of the aircraft flight information system 102 that high level navigational threats are present.

Since the current flightpath of the aircraft of 334 degrees is included in the range of non-allowed steering directions indicated by the alert band 426B, a navigation alert region 502 is displayed, the intersection icon 504 where the other aircraft 106 and the ownship 104 are predicted to meet is displayed, and the time remaining to act countdown timer 304 of the DAA gauge 158 displays a countdown of time remaining to change course before violation of the well clear separation condition. Presence of the navigation alert region 502 and the intersection icon 504 indicate to the pilot using the aircraft flight information system 102 that the high level navigational threat requires corrective action. The navigation alert region 502 is displayed in the color red and can include alternating stripes of different transparency so that the navigation alert region 502 is easily distinguished from the alert band 426B in the compass rose 422, which is displayed in the navigation alert region 502. The intersection icon 504 is presented as a solid (i.e., not semitransparent) icon in red. In some implementations, the time remaining to act displayed in the TRTA countdown timer 304 is also displayed in the ownship text 420, in the aircraft information panel 154, or both, in red or highlighted in red.

The various examples of the display 108 in FIGS. 4-6 are configured to dynamically update to convey information regarding the time-criticality (and in-turn priority) of responding to various navigational hazards. The display 108 also provides guidance in a manner that helps the pilot to associate and prioritize relevant information with particular navigation hazards (e.g., to indicate which of the other aircraft 106 in an airspace is the most urgent navigational hazard relative to the ownship 104). Also, in the specific examples illustrated in FIGS. 4-6, only alert bands 316, 426, and 602 are depicted in the DAA gauge 158 and in the compass rose 422. The alert bands 316, 426, 602 indicate to the pilot using the aircraft flight information system 102 non-allowed steering directions. In other implementations, one or more advice bands (e.g., the advice band 320 depicted in FIG. 3C) are presented in the DAA gauge 158, the compass rose 422, or both, to indicate directions to maneuver the ownship 104 to in order to obtain a well clear volume separation condition. By improving pilot situational awareness and decreasing pilot workload, the display 108 supports more effective and efficient pilot decision making for complex airspace scenarios, such as airspaces that have multiple other aircraft that are navigational hazards, encounters in proximity to terrain, inclement weather, etc.

Figure 7:
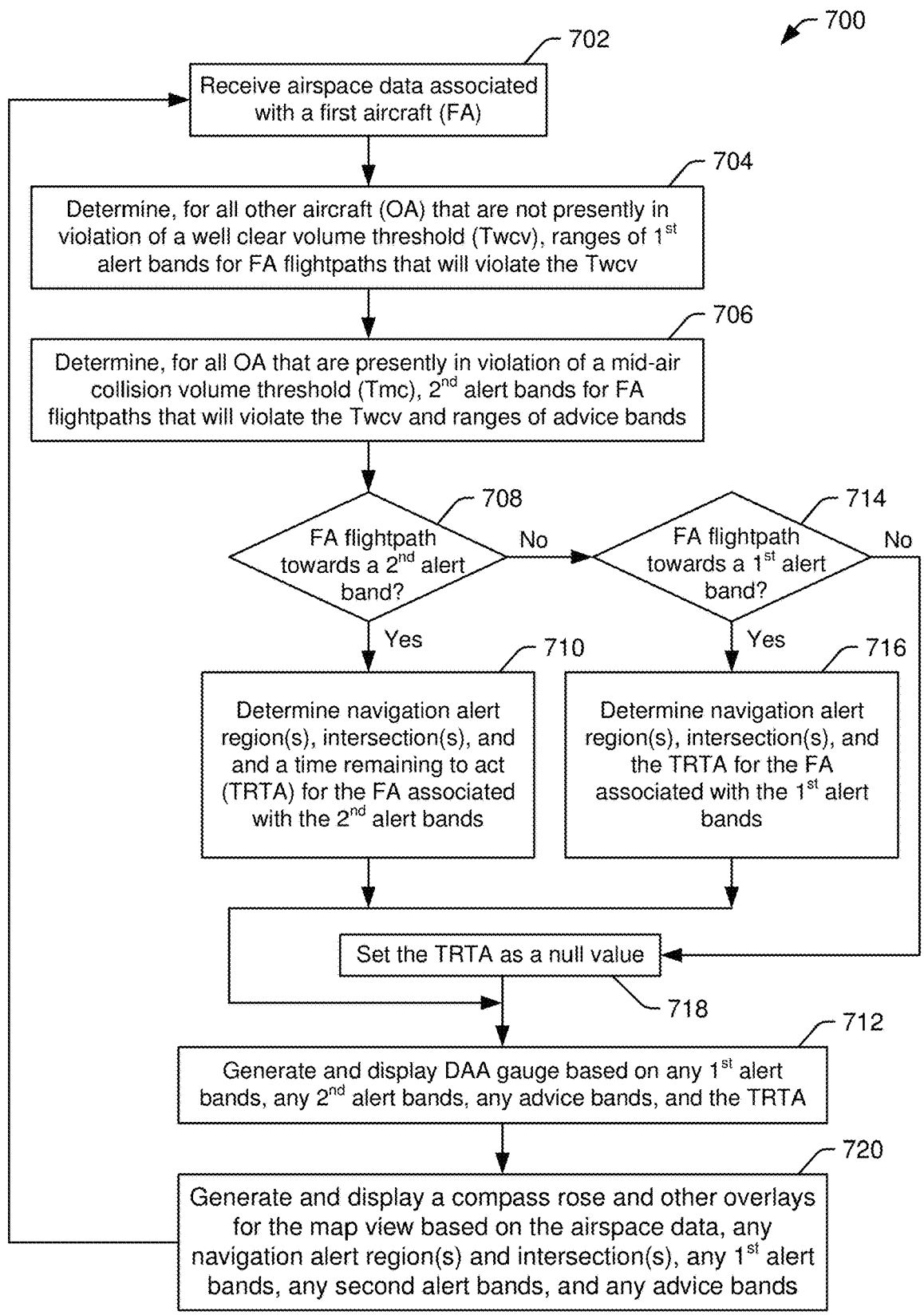
FIG. 7 is a flow chart that illustrates a first example of a method of generating an aircraft information display.

FIG. 7 is a flow chart that illustrates an example of a method 700 of generating an aircraft information display, such as the display 108 of one or more of FIGS. 1 and 4-6 that include the DAA gauge 158 and a map view of the ownship. The method 700 can be performed by the aircraft flight information system 102 of FIG. 1. For example, the processor(s) 114 of the aircraft flight information system 102 can execute the instructions 126 to perform operations of the method 700.

The method 700 includes, at 702, receiving airspace data associated with a first aircraft. For example, the communication interface(s) 120 of the aircraft flight information system 102 of FIG. 1 can receive the airspace data 132. In this example, the airspace data 132 is descriptive of an airspace environment around the first aircraft (e.g., the ownship 104). To illustrate, the airspace data 132 may be descriptive of the airspace 200 of FIG. 2, which includes the ownship 104 and the other aircraft 106.

The method 700 includes, at 704, determining, for all of the other aircraft that are not currently in violation of a well clear volume threshold, ranges of first alert bands for first aircraft flightpaths that will violate the well clear volume threshold. The aircraft flight information system 102 determines estimated flightpaths and separation distances between the other aircraft 106 and the ownship 104 based on the airspace data. The aircraft flight information system 102 compares the separation distances to the well clear volume threshold. For each of the other aircraft 106 not in violation of the well clear volume threshold, the aircraft flight information system 102 determines ranges of first alert bands for flightpaths of the ownship 104 that will result in violation of the well clear volume threshold. Directions included in the ranges of the first alert bands correspond to non-allowed steering directions for the ownship 104. The first alert bands are displayed as first alert bands 316 in the DAA gauge 158 and as first alert bands 426 in the compass rose 422.

A color of an icon for each of the other aircraft 106 that are not currently in violation of the well clear volume threshold and are associated with one of the first alert bands are set to a low level warning color (e.g., yellow) to indicate that such aircraft are potential navigation hazards. A color of an aircraft icon for the ownship 104 is also set to the warning color if there is at least one first alert band and none of the other aircraft 106 are in violation of the well clear volume threshold. For each of the other aircraft 106 that are not currently in violation of a well clear volume threshold and that are not associated with one of the first alert bands, a color of the icon for such other aircraft are set to a particular color (e.g., white) to indicate that such aircraft are associated with no navigation hazard. Also, if all of the aircraft 106 are not in violation of a well clear volume threshold and there are no first alert bands, or there are no aircraft in the vicinity of the ownship, a color for the aircraft icon for the ownship 104 is set to the particular color.

The method 700 includes, at 706, determining, for all of the other aircraft that are currently in violation of the well clear volume threshold, ranges of second alert bands for first aircraft flightpaths that will violate a mid-air collision volume threshold and ranges of advice bands. For each of the other aircraft 106 in violation of the well clear threshold, the aircraft flight information system 102 determines ranges of second alert bands for flightpaths of the ownship 104 that will result in violation of the mid-air collision volume threshold. Directions included in the ranges of the second alert bands correspond to additional non-allowed steering directions for the ownship 104. The second alert bands are displayed as second alert bands 318 in the DAA gauge 158 and as second alert bands 602 in the compass rose 422.

In addition to determining the ranges of the second alert bands, the aircraft flight information system 102 determines ranges of one or more advice bands for the ownship 104. The advice bands correspond to flightpaths for the ownship 104 that will result in a well clear separation condition for the ownship relative to the other aircraft 106. The advice bands are displayed as advice bands 320 in the DAA gauge 158, in the compass rose 422, or both.

For each of aircraft 106 that are currently in violation of the well clear volume threshold, a color of an icon associated with such aircraft is set to danger color (e.g., red) to indicate that such aircraft are a navigational threat. The color for the aircraft icon associated with the ownship is also set to the danger color. In addition, if any of such aircraft are also in violation of the mid-air collision threshold, icons for these icons are set to flash to indicate that these aircraft are imminent navigational threats.

The method 700, includes determining, at 708, whether the first aircraft flightpath is toward a second alert band (e.g., whether the first aircraft is included in one of the ranges of the second alert bands). If the flightpath of the first aircraft is toward a second alert band, the method 700 includes, at 710, determining one or more navigation alert regions, one or more intersections (e.g., estimated collision locations), and a TRTA. The one or more navigation alert regions and one or more intersections can correspond to the navigation alert region 502 and intersection icon 504 depicted in FIG. 6. The TRTA is a time remaining to act to avoid a mid-air collision separation condition violation. A color associated with the time remaining to act is set to the danger color. When more than one intersection is determined, the TRTA is the smallest TRTA of the determined TRTAs. The TRTA corresponds to a time displayed in the TRTA countdown timer 304 of the DAA gauge 158. The method 700 then continues, at 712.

If the flightpath of the first aircraft is not toward a second alert band, at 708, the method 700 includes determining, at 714, whether the first aircraft flightpath is toward a first alert band (e.g., whether the flightpath of the first aircraft is included in one of the ranges of the first alert bands 316, 426 depicted in the DAA gauge 158 or the compass rose 422, respectively). If the flightpath of the first aircraft is toward a first alert band, the method 700 includes, at 716, determining one or more navigation alert regions, one or more intersections, and a TRTA. The one or more navigation alert regions and one or more intersections can correspond to the navigation alert region 502 and intersection icon 504 depicted in FIG. 5. The TRTA is a time remaining to act to avoid the well clear separation condition violation. When more than one intersection is determined, the TRTA is the smallest TRTA of the determined TRTAs. A color for the TRTA is set to the warning color. The method 700 then continues, at 712.

If the flightpath of the first aircraft is not toward a first alert band, at 714, the method 700 includes, at 718, setting the TRTA as a null value. Setting the TRTA to a null value results in the TRTA countdown timer 304 of the DAA gauge 158 displaying blanks or nothing instead of numeric values. The method 700 then continues, at 712.

The method 700, at 712 from 710, 716, or 718, generates and displays a DAA gauge based on any first alert bands, any second bands, any advice bands, and the TRTA. The DAA gauge can be one of the DAA gauges 158 depicted in FIGS. 2-6. Since the TRTA is a calculated value, the TRTA does not necessarily count down in a stepwise manner by seconds but can change significantly depending on a change in the flightpath of the ownship 104 implemented by the aircraft flight information system 102.

The method 700, at 720, generates and displays a compass rose and other overlays for the map view based on the airspace data, any navigation alert regions, any intersections, any first alert bands, and any advice bands. The compass rose can be one of the compass roses 422 depicted in FIGS. 4-6.

The method 700 then returns to 702. The method ends when the aircraft flight information system 102 stops being used to control the first aircraft.

Figure 8:
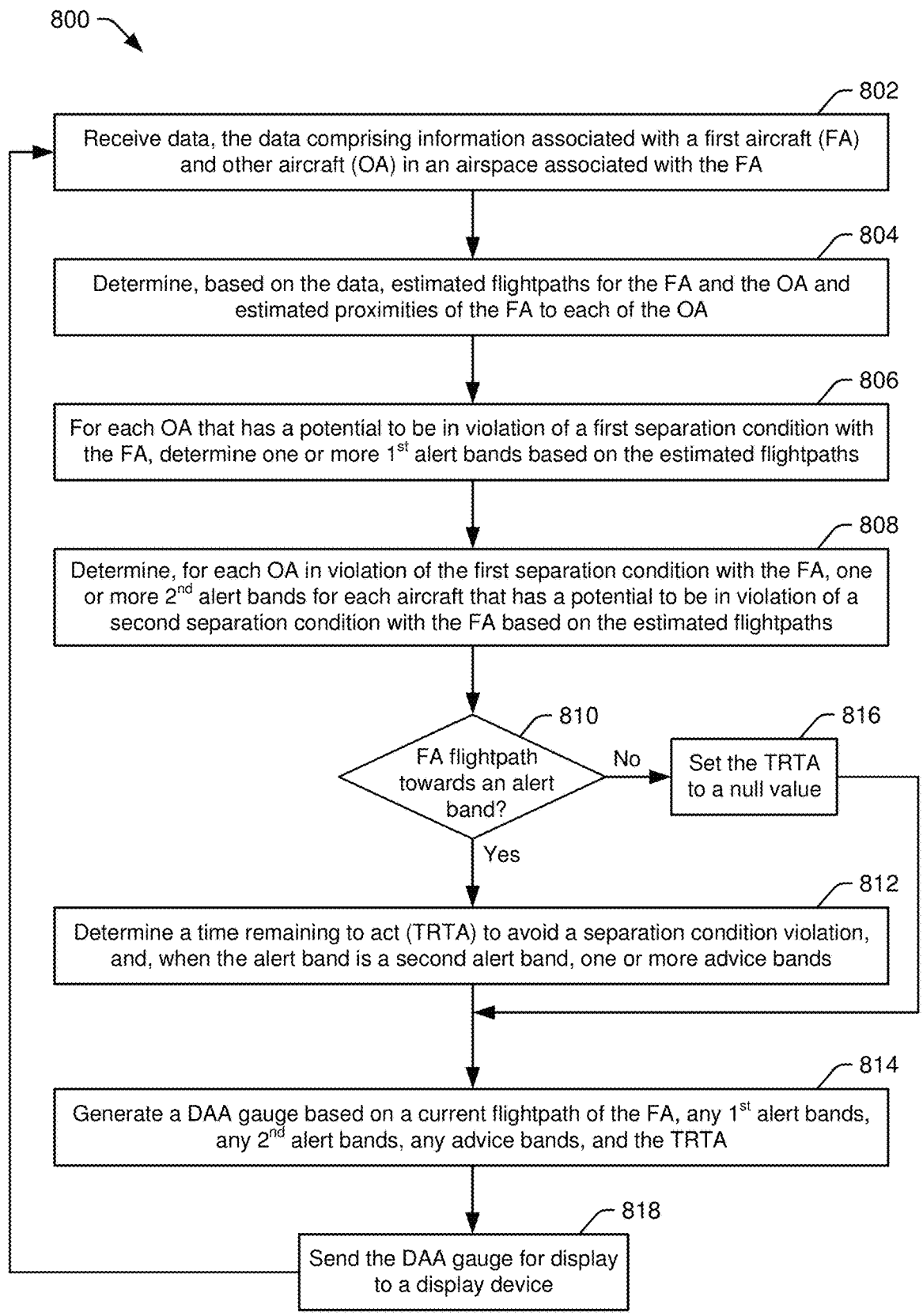
FIG. 8 is a flow chart that illustrates a second example of a method of generating an aircraft information display.

FIG. 8 is a flow chart that illustrates a second example of a method 800 of generating an aircraft information display that includes a DAA gauge 158, such as the DAA gauges 158 depicted in FIGS. 2-6. The method can be performed by the aircraft flight information system 102 of FIG. 1. For example, the processor(s) 114 of the aircraft flight information system 102 can execute the instructions 126 to perform operations of the method 800.

The method 800 includes, at 802, receiving data including information associated with a first aircraft and one or more other aircraft in an airspace associated with the first aircraft. The first aircraft corresponds to the ownship 104 of FIG. 1.

The method 800 includes, at 804, determining estimated flightpaths for the first aircraft and the one or more other aircraft and estimated proximities of the first aircraft to each of the other aircraft. The estimated flightpaths are determined, for example, by extrapolating the current heading and speed of each the first aircraft and the other aircraft. As another example, the estimated flightpath of the first aircraft can be determined as a set of possible flightpaths, based on the current heading and speed of the first aircraft and based on flight dynamics or operational limits of the first aircraft. Additionally, or in the alternative, the estimated flightpaths of the other aircraft can be determined as a set of possible flightpaths, based on the current heading and speed of the other aircraft and based on flight dynamics or operational limits of the other aircraft.

Various methods can be used to determine the estimated proximity of the first aircraft to an aircraft of the other aircraft. As an example, each flightpath can be treated as a line in space, and a geometric calculation can be used to solve for a minimum distance between the two lines. In this example, if the geometric calculation indicates that the two lines approach within a threshold distance (e.g., a minimum separation threshold) the calculation indicates that a separation violation condition is expected to occur. Subsequently, additional calculations can be used to determine a time or times along the flightpath during which the two aircraft are expected to be within the separation threshold from one another.

The method 800 includes, at 806, for each of the other aircraft that has a potential to be in violation of a first separation condition (e.g., a potential well clear separation condition violation), determining one or more alert bands based on the estimated flightpaths. The one or more first alert bands correspond to first ranges of directions of travel of the first aircraft that will result in the first separation condition violation. The method includes, at 808, for each other aircraft in violation of the first separation condition with the first aircraft, determining one or more second alert bands for each aircraft that has a potential to be in violation of a second separation condition (e.g., a mid-air collision separation condition) with the first aircraft based on the estimated flightpaths.

The method 800 includes determining, at 810, whether the first aircraft is heading toward one of the alert bands (e.g., whether the flightpath of the first aircraft is included in one of the ranges of the first alert bands). If the flightpath of the first aircraft is toward an alert band, the method 800 includes, at 812, determining a TRTA to avoid a separation condition violation, and, when the alert band is a second alert band, determining one or more advice bands. The advice bands correspond to flightpath ranges for the first aircraft that will result in regaining the first separation condition. The method 800 continues at 814.

If the flightpath of the first aircraft is not toward an alert band, at 810, the method 800 includes, at 816, setting the TRTA as a null value. Setting the TRTA to a null value results in the TRTA countdown timer 304 of the DAA gauge 158 displaying blanks or nothing instead of numeric values. The method 800 then continues, at 814.

The method 800, at 814 from 812 or 816, generates a DAA gauge based on a current flightpath of the first aircraft, any first alert bands, any second bands, any advice bands, and the TRTA. The first alert bands are in a warning color (e.g., yellow) to indicate a potential first separation condition violation. The second alert bands are in a danger color (e.g., red) to indicate violation of the first separation condition and a potential to violate the second separation condition. When the TRTA countdown timer 304 of the DAA gauge displays numeric values, a color associated with the numeric values is the warning color when the first aircraft is not in violation of the first separation condition and the color associated with the numeric values is the danger color when the first aircraft is in violation of the first separation condition. When the first aircraft is in violation of the second separation condition, the color associated with the numeric values is the danger color and the numeric values are zeros.

The method 800, at 818, also includes sending the DAA gauge to a display device for display. The DAA gauge displays the flightpath indicator 302, any first alert bands 316, any second alert bands 318, any advice bands 320, and the TRTA countdown timer 320 as show in FIGS. 3-6. The method 800 returns to 802. The method 800 ends when the aircraft flight information system 102 stops being used to control the first aircraft.

Figure 9:
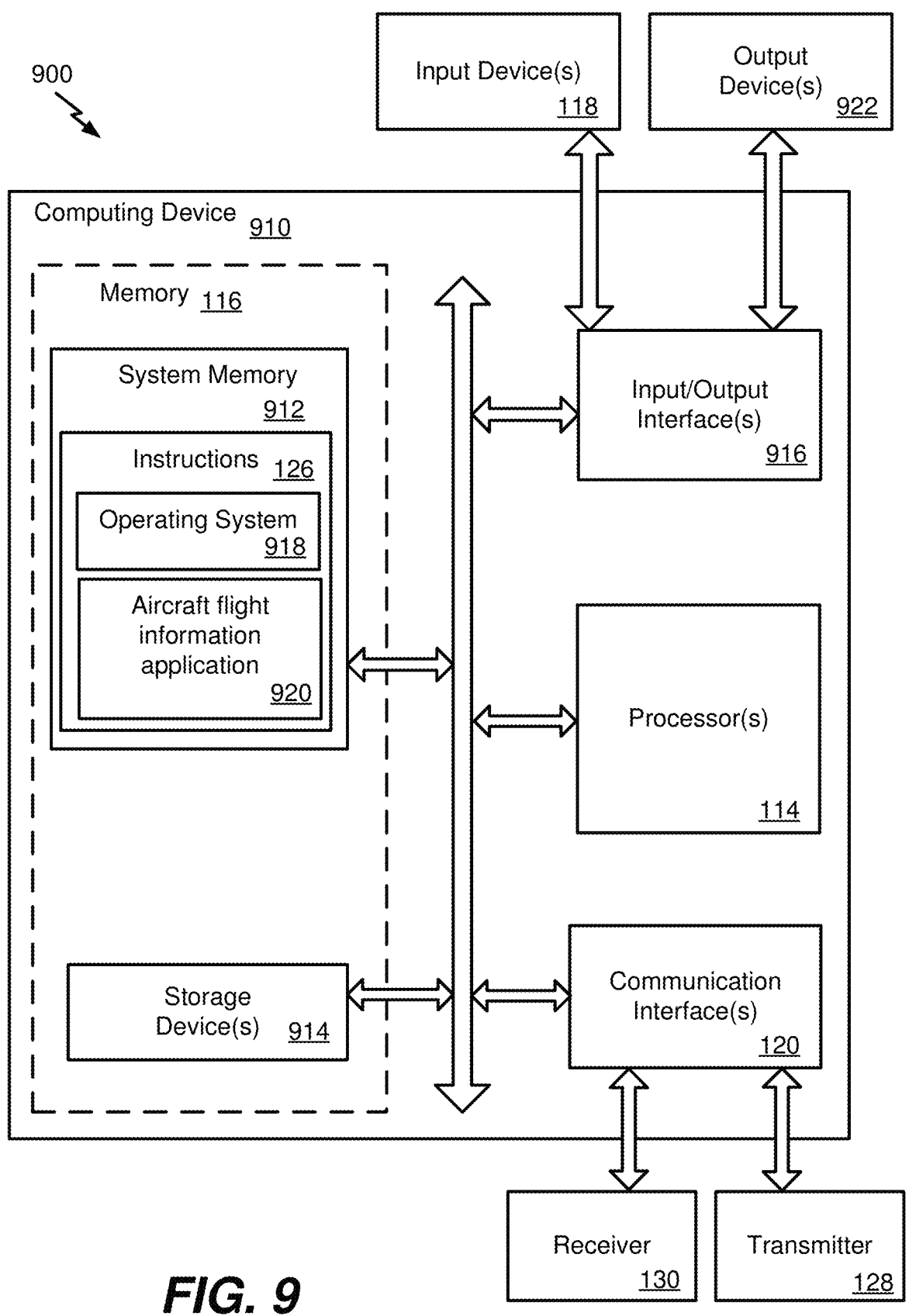
FIG. 9 is block diagram that illustrates an example of a computing environment including a computing device configured to perform operations of an aircraft flight information system.

FIG. 9 is block diagram that illustrates an example of a computing environment 900 including a computing device 910 that is configured to perform operations of an aircraft flight information system, such as the aircraft flight information system 102 of FIG. 1. The computing device 910, or portions thereof, may execute instructions to perform or initiate the functions of the aircraft flight information system 102. For example, the computing device 910, or portions thereof, may execute instructions according to any of the methods described herein, or to enable any of the methods described herein, such as the method 700 of FIG. 7 or the method 800 of FIG. 8.

The computing device 910 includes the processor(s) 114. The processor(s) 114 can communicate with the memory 116, which can include, for example, a system memory 912, one or more storage devices 914, or both. The processor(s) 114 can also communicate with one or more input/output interfaces 916 and the communication interface(s) 120.

In a particular example, the memory 116, the system memory 912, and the storage devices 914 include tangible (e.g., non-transitory) computer-readable media. The storage devices 914 include nonvolatile storage devices, such as magnetic disks, optical disks, or flash memory devices. The storage devices 914 can include both removable and non-removable memory devices. The system memory 912 includes volatile memory devices (e.g., random access memory (RAM) devices), nonvolatile memory devices (e.g., read-only memory (ROM) devices, programmable read-only memory, and flash memory), or both.

In FIG. 9, the system memory 912 includes the instructions 126, which include an operating system 918 and an aircraft flight information application 920. The operating system 918 includes a basic input/output system for booting the computing device 910 as well as a full operating system to enable the computing device 910 to interact with users, other programs, and other devices. The aircraft flight information application 920 includes one or more of the flight control instructions 140, the flightpath estimation instructions 142, the TRTA estimation instructions 144, or the GUI generation instructions 146 of FIG. 1.

The processor(s) 114 is coupled, e.g., via a bus, to the input/output interfaces 916, and the input/output interfaces 916 are coupled to the one or more input devices 118 and to one or more output devices 922. The output device(s) 922 can include, for example, the display device(s) 122 and the other output devices 124 of FIG. 1. The input/output interfaces 916 can include serial interfaces (e.g., universal serial bus (USB) interfaces or Institute of Electrical and Electronics Engineers (IEEE) 1394 interfaces), parallel interfaces, display adapters, audio adapters, and other interfaces.

The processor(s) 114 are also coupled (e.g., via the bus) to the communication interface 120. The communication interface 120 includes one or more wired interfaces (e.g., Ethernet interfaces), one or more wireless interfaces that comply with an IEEE 802.11 communication protocol, other wireless interfaces, optical interfaces, or other network interfaces. In the example illustrated in FIG. 9, the communication interface 120 is coupled to the transmitter 128 and to the receiver 130. However, in other implementations, such as the example illustrated in FIG. 1, the transmitter 128 and the receiver 130 are components of or integrated within the communication interface 120.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

The invention claimed is:

1. An aircraft flight information system comprising:
   a processor;
   a display device coupled to the processor; and
   a memory storing instructions executable by the processor to:
   receive data associated with a first aircraft and one or more other aircraft in an airspace associated with the first aircraft; and
   send a user interface based on the data to the display device for display, wherein the user interface comprises a system monitor panel comprising gauges, wherein the gauges comprise a detect and avoid (DAA) gauge configured to display a flightpath indicator for the first aircraft and projected separation violations with respect to the one or more other aircraft.

2. The aircraft flight information system of claim 1, wherein the DAA gauge is configured to depict one or more first alert bands indicating a first range of directions of travel projected to result in violation of a first separation condition.

3. The aircraft flight information system of claim 2, wherein the DAA gauge is further configured to depict one or more second alert bands indicating a second range of directions of travel projected to result in violation of a second separation condition.

4. The aircraft flight information system of claim 3, wherein the first separation condition is associated with a projected well clear volume violation, and wherein the second separation condition is associated with a projected mid-air collision volume violation.

5. The aircraft flight information system of claim 4, wherein the DAA gauge comprises a countdown timer, wherein the countdown timer indicates a time remaining to act to avoid violation of the second separation condition in response to the flightpath indicator indicating the direction of travel of the first aircraft is in a first particular direction included in the second range of directions of travel, and wherein the time remaining to act to avoid violation of the second separation condition is based on maneuverability characteristics of the first aircraft.

6. The aircraft flight information system of claim 5, wherein the countdown timer indicates a time remaining to act to avoid violation of the first separation condition in response to the flightpath indicator indicating the direction of travel of the first aircraft is in a second particular direction included in the first range of directions of travel and not included in the second range of directions of travel, and wherein the time remaining to act to avoid violation of the first separation condition is based on the maneuverability characteristics of the first aircraft.

7. The aircraft flight information system of claim 6, wherein the one or more first alert bands and the countdown timer are presented in a first color in response to the flightpath indicator indicating the direction of travel of the first aircraft is in the first particular direction, and wherein the one or more second alert bands and the countdown timer are presented in a second color distinct from the first color in response to the flightpath indicator indicating the direction of travel of the first aircraft is in the second particular direction.

8. The aircraft flight information system of claim 3, wherein the one or more first alert bands are displayed as one or more arcs in a first annular region of the DAA gauge in a first color, and wherein the one or more second alert bands are displayed as one or more arcs in a second annular region of the DAA gauge in a second color distinct from the first color.

9. The aircraft flight information system of claim 3, wherein the DAA gauge is configured to depict one or more advice bands indicating one or more directions to travel toward to regain to regain a separation violation condition, and wherein the one or more advice bands are presented in a third color distinct from a first color used to depict the one or more first alert bands and distinct from a second color used to depict the one or more second alert bands.

10. The aircraft flight information system of claim 1, wherein the user interface includes a view point display configured to display a map view including positions of the first aircraft and the one or more other aircraft overlaid on a map or image of a region associated with the position of the first aircraft.

11. The aircraft flight information system of claim 10, wherein an indicator for an aircraft of the one or more other aircraft includes one or more of an icon, an identifier associated with the aircraft, a relative altitude indicator, or an indication of a boundary of a well clear volume associated with the aircraft.

12. The aircraft flight information system of claim 11, wherein the user interface is configured to display a first indicator next to the relative altitude indicator in response to an increase in an altitude of the aircraft from the one or more other aircraft relative to the first aircraft, and wherein the user interface is further configured to display a second indicator next to the relative altitude indicator in response to a decrease in the altitude of the aircraft from the one or more other aircraft relative to the first aircraft.

13. A method of generating an aircraft display, the method comprising:
receiving data at a device, wherein the data comprises information associated with a first aircraft and one or more other aircraft in an airspace associated with the first aircraft;
determining, at the device, estimated flightpaths for the first aircraft and the one or more other aircraft;
generating, at the device, a detect and avoid (DAA) gauge based on a current flightpath of the first aircraft and the estimated flightpaths; and
sending, from the device to a display device coupled to the device, the DAA gauge for display, wherein the DAA gauge is configured to display a flightpath indicator to indicate a direction of travel of the first aircraft and to display alert bands related to projected separation condition violations with respect to the one or more other aircraft.

14. The method of claim 13, wherein the alert bands include first alert bands and second alert bands, and further comprising determining, at the device, a first alert band, wherein the first alert band comprises a first range of directions, and wherein the first range of directions indicates directions of travel of the first aircraft that are projected to result in violation of a first separation condition.

15. The method of claim 14, further comprising determining, at the device, a second alert band in response to the first aircraft being in violation of the first separation condition, wherein the second alert band comprises a second range of directions, and wherein the second range of directions indicates directions of travel of the first aircraft that are projected to result in violation of a second separation condition.

16. The method of claim 13, further comprising determining, at the device, a time remaining to act to avoid a projected separation violation condition based on the direction of travel of the first aircraft being toward one of the alert bands and based on maneuverability characteristics of the first aircraft.

17. The method of claim 13, wherein the device is a computing device of the first aircraft or a remote pilot station of an unmanned aircraft.

18. A detect and avoid (DAA) gauge for an aircraft flight information system, the DAA gauge comprising:
a flightpath indicator, wherein the flightpath indicator comprises an arrow indicating a direction of travel of a first aircraft; and
one or more regions configured to display information related to projected separation violations of the first aircraft relative to one or more other aircraft in an airspace associated with the first aircraft, wherein the projected separation violations are determined based on a plurality of possible directions of travel of the first aircraft.

19. The DAA gauge of claim 18, further comprising a countdown timer that indicates a time remaining to act in response to the direction of travel being in a direction resulting in a projected separation violation of the projected separation violations.

20. The DAA gauge of claim 18, wherein the one or more regions comprise a first annular region surrounding the flightpath indicator, wherein the first annular region is configured to display one or more first alert bands indicating directions of travel projected to result in violation of a well clear volume separation condition.

21. The DAA gauge of claim 20, wherein the one or more regions further comprise a second annular region surrounding the flightpath indicator, wherein the second annular region is configured to display one or more second alert bands indicating directions of travel projected to result in violation of a mid-air collision volume separation condition.

* * * * *